(12) United States Patent
Matsuda et al.

(10) Patent No.: US 8,908,930 B2
(45) Date of Patent: Dec. 9, 2014

(54) BIOMETRICS AUTHENTICATION DEVICE AND METHOD

(75) Inventors: Yusuke Matsuda, Tachikawa (JP); Akio Nagasaka, Kokubunji (JP); Naoto Miura, Kokubunji (JP); Harumi Kiyomizu, Inagi (JP); Takafumi Miyatake, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 185 days.

(21) Appl. No.: 13/225,801

(22) Filed: Sep. 6, 2011

(65) Prior Publication Data

US 2012/0114195 A1    May 10, 2012

(30) Foreign Application Priority Data

Nov. 4, 2010 (JP) .................... 2010-247000

(51) Int. Cl.
    *G06K 9/00*      (2006.01)
    *G06K 9/50*      (2006.01)
    *G06K 9/62*      (2006.01)

(52) U.S. Cl.
    CPC .. G06K 9/00013 (2013.01); *G06K 2009/00932* (2013.01)
    USPC ............................. 382/115; 382/201; 382/209

(58) Field of Classification Search
None
See application file for complete search history.

(56) References Cited

U.S. PATENT DOCUMENTS

| | | | | |
|---|---|---|---|---|
| 7,158,660 B2 * | 1/2007 | Gee et al. | ....................... | 382/128 |
| 7,974,446 B2 * | 7/2011 | Fujiwara | ....................... | 382/118 |
| 2001/0040988 A1 | 11/2001 | Takahashi | | |
| 2005/0047632 A1 | 3/2005 | Miura et al. | | |
| 2006/0104484 A1 | 5/2006 | Bolle et al. | | |
| 2006/0215887 A1 | 9/2006 | Nishimura et al. | | |
| 2008/0144889 A1 * | 6/2008 | Abe | ............................. | 382/115 |
| 2010/0098299 A1 * | 4/2010 | Muquit et al. | ................ | 382/115 |
| 2010/0208947 A1 * | 8/2010 | Muquit et al. | ................ | 382/115 |

FOREIGN PATENT DOCUMENTS

| | | |
|---|---|---|
| JP | 08-263658 A | 10/1996 |
| JP | 11-225326 A | 8/1999 |
| JP | 2003-263640 A | 9/2003 |
| JP | 2008-269534 A | 11/2008 |
| JP | 2009-098935 A | 5/2009 |
| JP | 2010-35560 A | 2/2010 |
| JP | 2010-39534 A | 2/2010 |
| JP | 2010-211579 A | 9/2010 |

OTHER PUBLICATIONS

European Search Report received in European Application No. 11007335 dated Mar. 13, 2012.

(Continued)

*Primary Examiner* — Bhavesh Mehta
*Assistant Examiner* — David F Dunphy
(74) *Attorney, Agent, or Firm* — Mattingly & Malur, PC

(57) ABSTRACT

A primary object of the present invention is to extract a difference in shading of a blood vessel image in a picked up image as information to be used for authentication, and to acquire a larger number of pieces of biometric information from one image. An individual authentication device to be used to authenticate an individual using feature information of a vascular pattern acquired from a living body includes an imaging unit that images a region of the living body serving as an object of authentication, and an arithmetic unit that acquires the picked up image as an authentication image. The arithmetic unit extracts a vascular pattern from the authentication image, and acquires a degree of shading of the vascular pattern as the feature information.

13 Claims, 22 Drawing Sheets

(56) References Cited

OTHER PUBLICATIONS

Pierre-Olivier Ladoux et al: "Palm Vein Verification System Based on SIFT Matching", Jun. 2, 2009, Advances in Biometrics, Springer Berlin Heidelberg, pp. 1290-1298.

Chia-Ling Tsai et al: "The Edge-Driven Dual-Bootstrap Iterative Closest Point Algorithm for Registration of Multimodal Fluorescein Angiogram Sequence" IEEE Transcations on Medical Imaging; Piscataway, NJ; vol. 5, No. 3, Mar. 1, 2010; pp. 636-649.

Keerthi Ram et al: "Curvature Orientation Histograms for Detection and Matching of Vascular Landmarks in Retinal Images", Proceedings of SPIE, vol. 7259, Jan. 1, 2009, pp. 72591J-72591J-8.

Jian Zheng et al: "Retinal Image Registration Based on Salient Feature Regions"; 2009 Annual International Conference of the IEEE Engineering in Medicine and Biology Society; Minneapolis, Minnesota; Sep. 6, 2009, pp. 102-105.

* cited by examiner

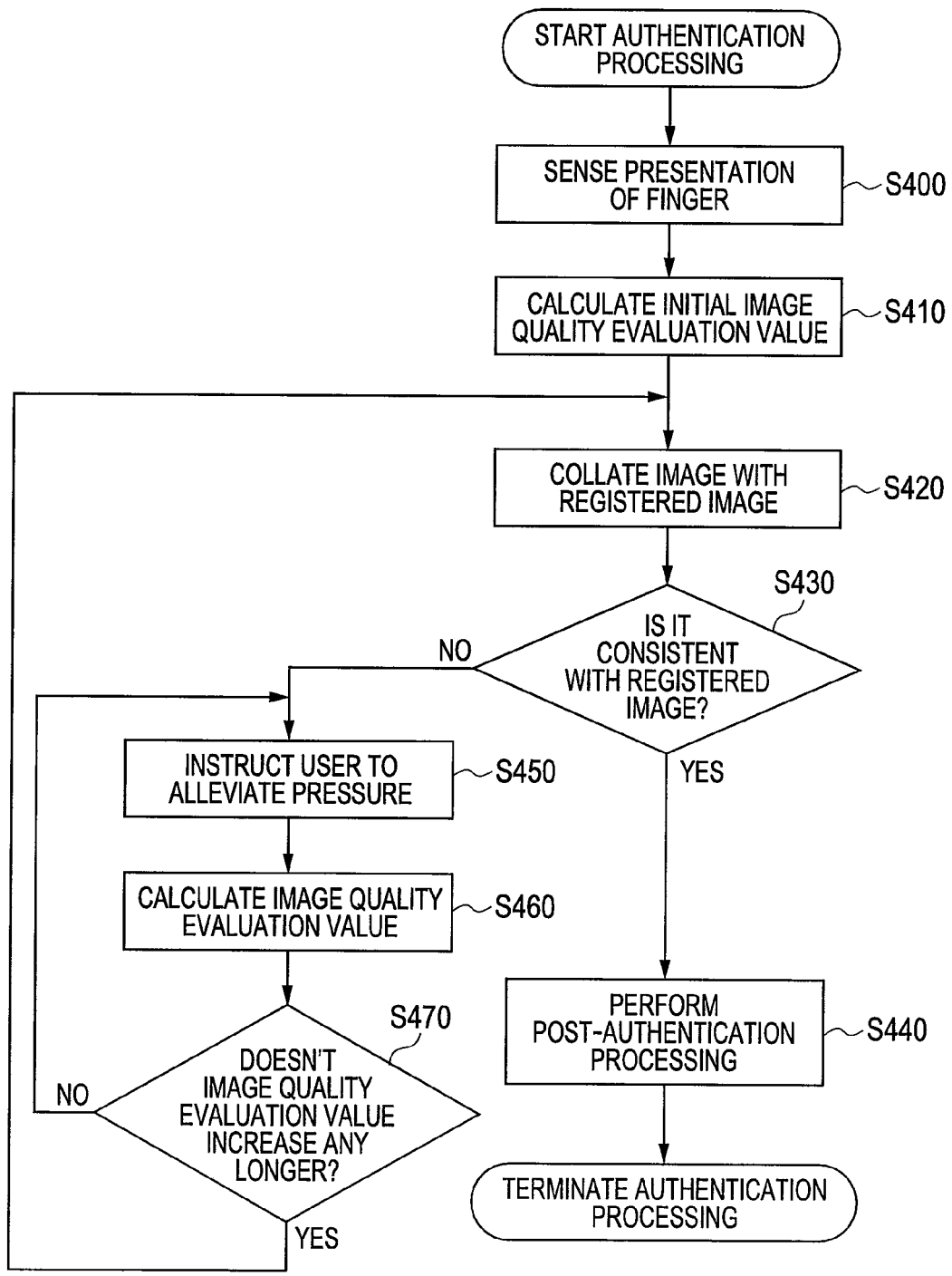

BIOMETRICS AUTHENTICATION DEVICE AND METHOD

CLAIM OF PRIORITY

The present application claims priority from Japanese Patent Application JP2010-247000 filed on Nov. 4, 2010, the content of which is hereby incorporated by reference into this application.

BACKGROUND OF THE INVENTION (1) Field of the Invention

The present invention relates to a device and method for identifying an individual by utilizing biometric information on a human being, or more particularly, a finger vein pattern.

(2) Description of the Related Art

While an interest in a security technology for safely managing personal information and property has grown, biometrics authentication that uses biometric information on a human being has attracted attention. As an existing biometrics authentication technology, an authentication method that employs a fingerprint, the iris, voice, a face, a vein in the palm, or a finger vein is known. In particular, a vein authentication technology that utilizes absorption of infrared light, which is irradiated to a living body, by hemoglobin in blood has the advantage of a low psychological resistance owing to the capability to achieve authentication merely by irradiating light to a finger, and the advantage of excellent forgery-proof performance due to utilization of internal information on a living body.

Vein authentication is expected to be applied to various fields. In the field of management of people who join or leave a company or management of employees on whether they work hard or not, there is an increasing need for large-scale 1-to-N authentication involving plural sites. In a financial field, for example, usage in empty-handed settlement allowing a user to do shopping merely by placing a finger without the necessity of presenting any card is attracting attention. In this kind of usage, it is necessary to accurately discriminate several ten thousands to several millions of users from one another. High precision exceeding the level of precision guaranteed by existing finger vein authentication is requested.

Japanese Patent Application Laid-Open Publication No. 2010-35560 has disclosed a method for, compared with a case where one finger is required, improving precision in authentication by increasing the number of fingers employed in authentication. Japanese Patent Application Laid-Open Publication No. 2010-39534 has disclosed that a three-dimensional structure of a blood vessel appearing in an image picked up by plural lenses is used for authentication.

BRIEF SUMMARY OF THE INVENTION

However, when the number of pieces of biometric information to be used for authentication is increased by acquiring plural vascular pattern images, it may impose a large load on arithmetic processing or a recording medium. Further, the increase in the number of pieces of biometric information leads to a decrease in an identification rate because of a change in an environment deriving from external light or a condition of a living body to be authenticated. Creation of a three-dimensional structure of a blood vessel by acquiring plural images requires a lens array or plural imaging devices, that is, requires a large number of components. There is therefore a possibility of increasing a cost or contradicting a trend to compactness. Further, the identification rate may be decreased because of unstable three-dimensional vascular information or a positional deviation occurring during authentication.

The present invention addresses the foregoing problems. A primary object of the present invention is to acquire a larger number of pieces of biometric information from one image by extracting a difference in shading of a blood vessel image in an image, which is picked up by a vascular image extraction device or an individual authentication device, as information to be used for authentication.

As an aspect of the present invention for addressing the foregoing problems, there is provided an individual authentication device to be used to authenticate an individual using feature information of a vascular pattern acquired from a living body. The individual authentication device includes an imaging unit that images a region of the living body serving as an object of authentication, and an arithmetic unit that acquires the picked up image as an authentication image. The arithmetic unit extracts a vascular pattern from the authentication image, and acquires a degree of shading of the vascular pattern as the feature information.

According to the aspect of the present invention, a difference in shading of a picked up vascular pattern is used to acquire a larger number of pieces of biometric information from one image.

BRIEF DESCRIPTION OF THE DRAWINGS

FIG. 9 is a diagram showing an example of a flowchart describing authentication processing in accordance with the present invention;

DETAILED DESCRIPTION OF THE INVENTION

First Embodiment

Figure 3:
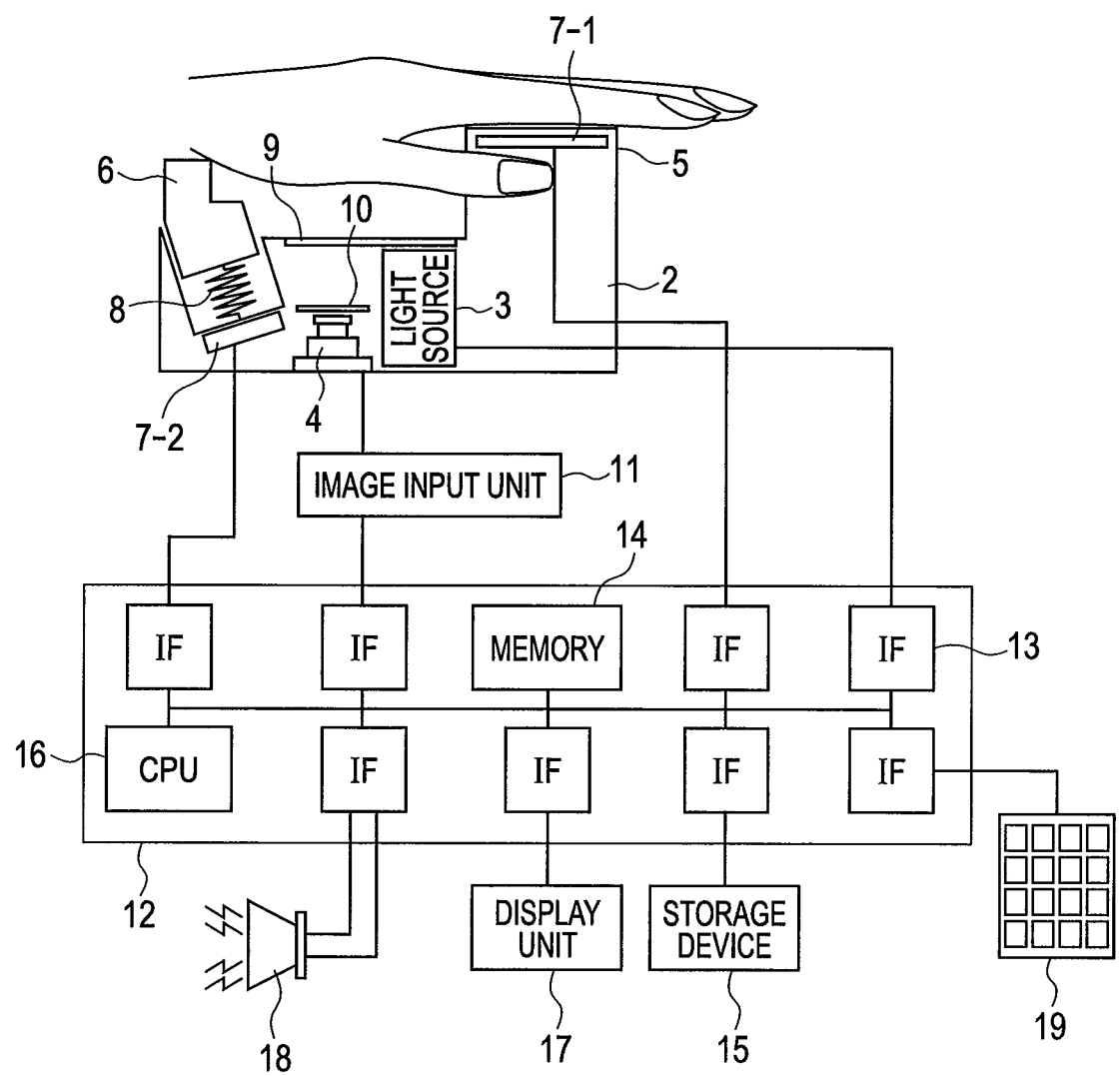
FIG. 3 is a diagram showing an example of a system configuration of the authentication device in which the present invention is implemented.

Referring to the drawings, an embodiment of the present invention will be described below. In relation to the present embodiment, especially, a finger vein authentication device will be described below. The present invention can be applied to an individual authentication device that employs, as shown in FIG. 3, a palm or any other part of a living body. Needless to say, the present invention can be applied to a vascular image extraction device that is a device of extracting a vascular image.

In order to extract feature information, which is employed in authentication, from the shading of an image, it is essential to pick up a larger number of pieces of vascular information. However, for example, between the time when information to be used for authentication is registered and the time when authentication and collation are performed later, there is a difference in a way of pressing a region of a living body on a device, a way of presenting the living-body region, or an amount of external light. Thus, reproducibility may become insufficient depending on an environmental change of the living body.

The present embodiment addresses the foregoing problem. A description will be made of an arrangement for acquiring higher-precision information on a vascular shape or shading of a blood vessel.

Figure 1:
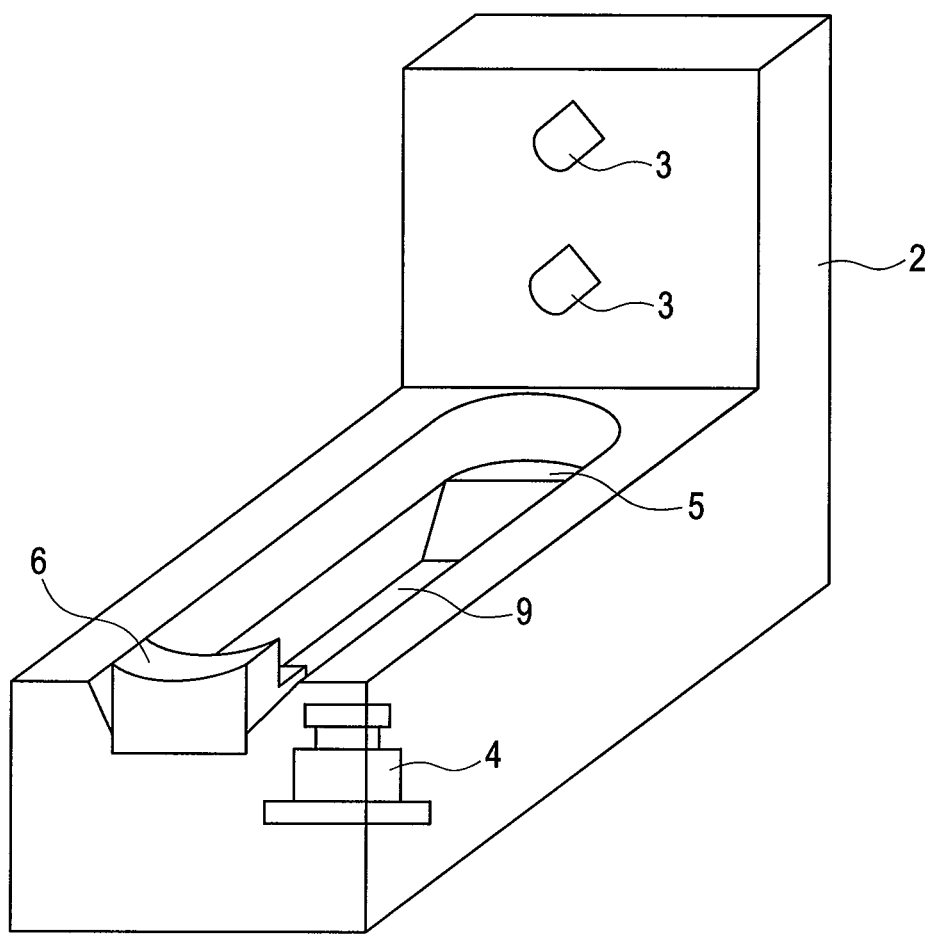
FIG. 1 is a diagram showing an example of an authentication device in which the present invention is implemented.
Figure 2:
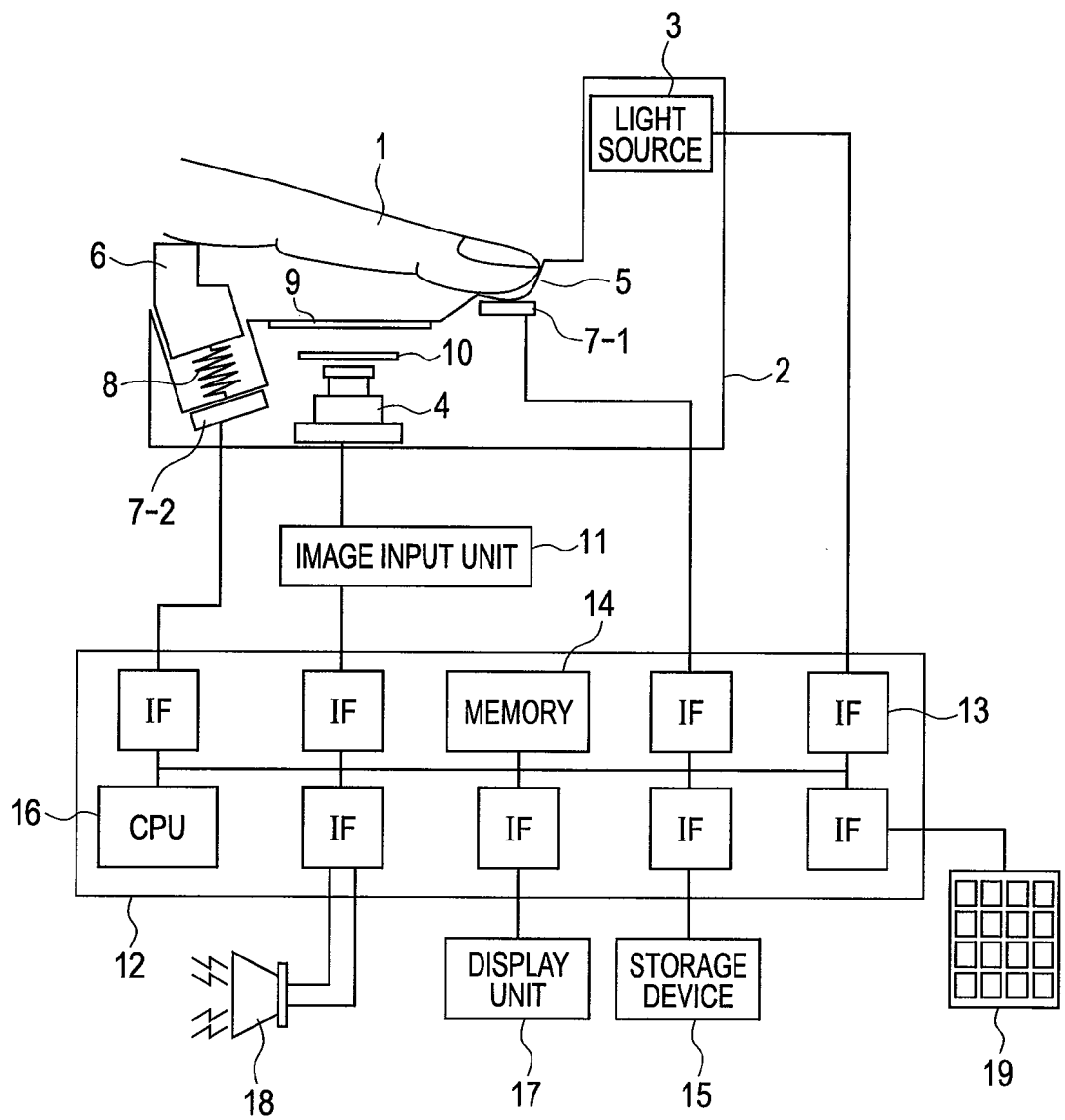
FIG. 2 is a diagram showing an example of a system configuration for the authentication device in which the present invention is implemented.

FIG. 1 is a diagram showing an example of an individual authentication device in accordance with the present invention, and FIG. 2 is a schematic diagram of a configuration for the individual authentication device shown in FIG. 1.

A user presents his/her finger 1 to an authentication device 2 at the time of authentication. At this time, the tip of the finger 1 is placed on a fingertip guide part 5, and the root of the finger 1 is placed on a finger placement guide part 6. When the finger 1 is presented to the device, a touch sensor or any other sensor, which is not shown, is used to sense the finger, and authentication processing is begun. For sensing the finger, a distance sensor, temperature sensor, or any other sensor may be employed.

The authentication device 2 is laterally shown in a sectional view. Pressure sensors 7-1 and 7-2 that sense a pressure of a presented finger are disposed below the finger placement guide part 6 and fingertip guide part 5 respectively. An elastic member 8 such as a spring is sandwiched between the finger placement guide part 6 and pressure sensor 7-2. The finger placement guide part 6 sinks downward due to a pressure exerted with contact with the finger. The elastic member 8 may be realized with a coil spring, blade spring, rubber member, or any other member as long as the member can alleviate the pressure. Owing to the sinking, the pressure to be applied to the guide part can be reduced as detailed later. Incidentally, a sinking direction may not be a downward direction but may be any direction as long as a pressing force can be reduced in the direction. In addition, an arrangement in which one of the pressure sensors 7-1 and 7-2 is employed will do.

Assuming that the device in which the present invention is implemented is of a tabletop type, when a living body places his/her finger on the guide parts, the finger is generally placed while applying a pressing force to the guide parts from obliquely above on the side of the living body. Therefore, when the elastic member 8 is disposed to alleviate the pressure applied from immediately above the device, there is a possibility that the pressure to be alleviated by the elastic member 8 may be limited to a perpendicular component but the elastic member 8 may not be able to alleviate a horizontal component of the pressure.

In the present embodiment, the elastic member 8 is, as shown in FIG. 2 and FIG. 3, disposed obliquely toward a living body with respect to an upper side of the device so that the elastic member can alleviate a pressing force applied in an advancing direction when the living body presents his/her finger to the device. Owing to the arrangement, the elastic member 8 can receive a larger pressure from the finger, and can alleviate a larger pressing force than it can when being disposed to alleviate a pressure applied from immediately above.

Authentication is executed according to a procedure to be described below. Infrared light is irradiated from a light source 3 to the dorsal side of the finger 1. The light is transmitted by the finger 1, passed through a finger presentation part 9 in which an object-of-authentication region of the finger is presented, and transmitted by an optical filter 10 that transmits light belonging to the infrared spectrum. Eventually, the light reaches an imaging unit 4. The light is converted into an electric signal by the imaging unit 4, and fetched as an image into a computer 12 via an image input unit 11. The fetched image is tentatively stored in a memory 14. Finger vein images (registered data items) registered in advance are loaded from a storage device 15 into the memory 14. According to a program stored in the memory 14, a CPU 16 collates the inputted image with the registered images.

In collation processing, a value of a correlation between two images to be compared with each other is calculated. Based on the value, a decision is made on whether the inputted image is consistent with the registered image. Based on the result, an individual is authenticated. If the individual is correctly authenticated, authentication-time processing is performed on an object of control by an authentication system. The pressure sensors 7-1 and 7-2 located below the finger placement guide part 6 and fingertip guide part 5 respectively detect a pressure exerted when a finger is pressed. The detected pressure value is used to perform computation. Based on the result of computation, a display unit 17 or a loudspeaker 18 is used to prompt a user to alleviate the pressure or suppress a variation in the pressure. As the display unit, a display, liquid-crystal display, or LED lamp may be adopted. As sounds uttered through the loudspeaker 18, voice or a beep sound may be adopted.

Included as authentication modes are a 1-to-N authentication mode in which an inputted image is collated with all registered images, and a 1-to-1 authentication mode in which: an ID number is inputted in advance in order to discriminate a user himself/herself or an IC card is presented to a card reader; and the inputted image is collated only with a registered image associated with the ID number or the ID information in the IC card. In the 1-to-N authentication mode, authentication is begun immediately after a finger is presented to the device. In the 1-to-1 authentication mode, after an input unit 19 is used to enter the ID number, a finger is presented for authentication.

Needless to say, the CPU, memory, storage device, and display unit may be incorporated in a terminal other than the authentication device 2.

An existing individual authentication device includes a guide part that is intended to fix a finger position to a specific position so that a user can present his/her finger in a well-reproducible manner. By presenting a finger to the guide part, the reproducibility of a venous image to be picked up gets higher. Eventually, high-precision authentication can be achieved. However, depending on a contact state of a finger with the guide part attained when the finger is presented, there is a possibility that a bloodstream in the finger may be stopped because it is pressed and a vascular pattern may be partly lost. Further, if a finger is presented while being warped, there is a possibility that a blood vessel may be pressed due to an epidermal tension and a vascular pattern may be lost. If an image is registered with a finger strongly pressed on the device or warped, a vascular pattern is lost, and the image is registered with a smaller number of pieces of information than the number of pieces of information provided by the vascular pattern. In addition, a pressing pressure value or a degree of finger warp varies every time a finger is presented. Since an obtained vascular pattern is not stabilized, reproducibility at the time of authentication is degraded.

Therefore, in order to upgrade precision in finger vein authentication, it is necessary to register an image that contains all vascular patterns without any vascular pattern lost due to strong pressing of a finger or warp thereof, and to improve reproducibility of a finger to be presented at the time of authentication. In order to upgrade the reproducibility, while a position of finger presentation is fixed to a certain position using the guide part, part of the finger to be employed in authentication is not brought into contact with the device for fear any of the vascular patterns may be lost.

Figure 4:
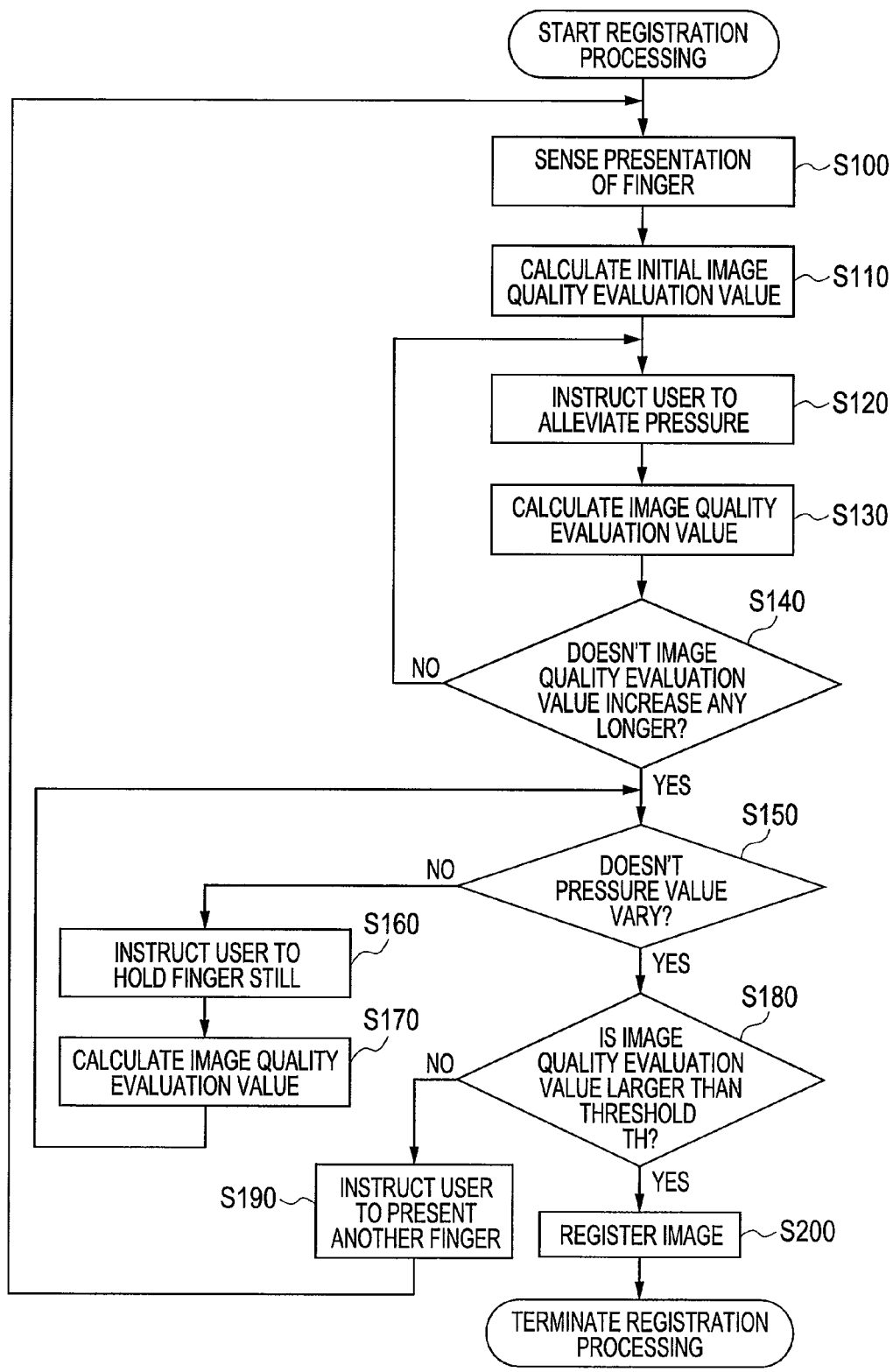
FIG. 4 is a diagram showing an example of a flowchart describing registration processing in accordance with the present invention.

An example of a procedure ending with registration processing to be performed on data to be used for authentication and being employed in the present embodiment will be described in conjunction with a flowchart of FIG. 4. First, at step S100, the fact that a finger is presented to the device is sensed. At step S110, an initial image quality evaluation value is calculated using a picked up vascular image. The image quality evaluation value refers to a content percentage of vascular patterns that are obtained by assigning two values to vascular pixels and the other pixels using, for example, a method that employs an edge enhancement filter which enhances segments or a matched filter, a method of extracting line patterns by tracing line components, or a method of extracting a dent position on a sectional profile of an image at which a luminance value locally falls. Otherwise, the image quality evaluation value refers to a content percentage of a highly specific area such as an area in which a bend or branch of a blood vessel appears. The content percentage of vascular patterns can be expressed as a ratio of the number of vascular pixels to a sum total of pixels constituting an image that is binary-coded into an image of blood vessels and an image of the others. The content percentage of the highly specific area can be expressed as a ratio of the number of pixels constituting the specific area to the sum total of pixels constituting the image that is binary-coded into the specific area in which a blood vessel appears to be bent or branched out, and the other area.

At step S120, the display unit 17 or the like is used to prompt a user to alleviate a pressure exerted by a presented finger. At step S130, an image quality evaluation value is re-calculated. At step S140, a value by which the image quality evaluation value is increased or decreased after the pressure is alleviated is calculated. If the image quality evaluation value is increased, the user is prompted to further alleviate the pressure. If the image quality evaluation value does not increase any longer, at step S150, the pressure is checked to see if the pressure value does not vary any longer. If the pressure value varies but is not stabilized, at step S160, the user is instructed to hold his/her finger still so as to suppress a variation in the pressure value. At step S170, the image quality evaluation value is re-calculated. If the pressure value does not vary any longer, at step S180, the image quality evaluation value is checked to see if it exceeds a threshold TH. If the image quality evaluation value falls below the threshold TH, at step S190, the user is instructed to present another finger. If the image quality evaluation value exceeds the threshold TH, at step S200, the image is registered as registrable data to be employed in authentication.

For sensing finger presentation, not only a pressure sensor but also a temperature sensor, distance sensor, or bloodstream sensor that utilizes the Doppler effect of light may be used. Thus, while a decision is made on a living body, presentation of a finger can be sensed.

As a method of determining the threshold TH for image quality evaluation values, for example, as long as a large-capacity vascular image database can be prepared in advance, the database and a discriminability evaluation value are used to determine the threshold for image quality evaluation values. The discriminability evaluation value is an index signifying how precisely a venous image of the same finger as a certain finger can be discriminated from a venous image of another finger. For example, a venous image of a certain finger is collated with N images that include at least one venous image of the same finger and venous images of other fingers and that are contained in the database.

Figure 5A:
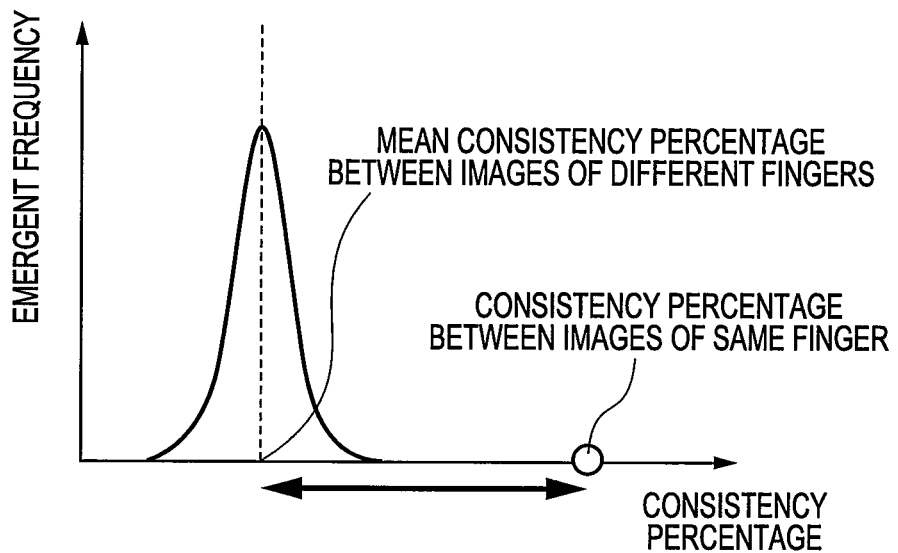
FIG. 5A and FIG. 5B are diagrams showing a relationship between a consistence ratio and an emergent frequency.
Figure 5B:
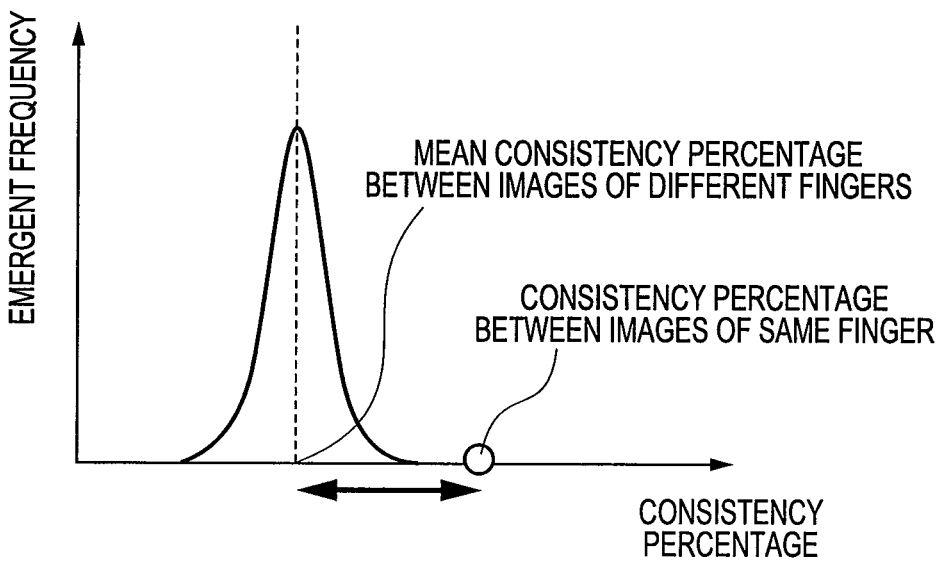

FIG. 5A and FIG. 5B are graphs whose axes of abscissas indicate a consistency percentage attained when an image of a certain finger 1 or 2 is collated with any of images contained in a database and whose axes of ordinates indicate an emergent frequency of the consistency percentage. As for the finger 1, the reproducibility of vascular patterns is high. When the vascular patterns can be stably acquired, the consistency percentage between images of the same finger is high. If a mean consistency percentage of an image of the finger 1 with respect to an image of another finger is low, there is a large difference between the consistency percentage of the image of the finger 1 with respect to the image of the same finger and the consistency percentage thereof with respect to the image of another finger. Therefore, the discriminability of the image of the finger 1 is high. In contrast, as for the finger 2, the consistency percentage between images of the same finger is low, and a mean consistency percentage with respect to an image of another finger is high. Therefore, there is a small difference between the consistency percentage of the image of the finger 2 with respect to the image of the same finger and the consistency percentage thereof with respect to the image of another finger. The discriminability of the image of the finger 2 is therefore low.

Figure 6:
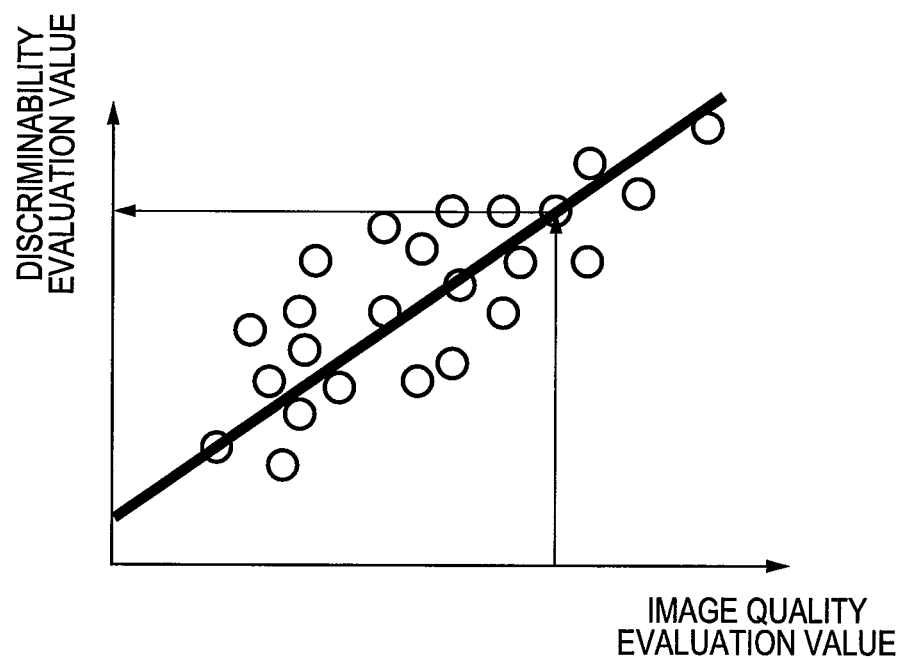
FIG. 6 is a diagram showing a relationship between an image quality evaluation value and a discriminability evaluation value.

As for a method of determining a discriminability evaluation value, there is a method of determining the discriminability evaluation value so that the lower a mean consistency percentage with respect to an image of another finger is, the higher the discriminability evaluation value is, or a method of determining the discriminability evaluation value using the magnitude of a mean difference between the consistency percentage with respect to an image of the same finger and the consistency percentage with respect to an image of another finger. Assume that the axis of ordinates indicates the discriminability evaluation value and the axis of abscissas indicates an image quality evaluation value, and that all registered data items contained in a database are plotted. An image having a high discriminability evaluation value shows a large number of blood vessels, and contains many specific areas in which a blood vessel appears to be bent or branched out. Therefore, the image having the high discriminability evaluation value also has a high image quality evaluation value. As shown in FIG. 6, the discriminability evaluation values and image quality evaluation values of images are distributed to get higher rightward. The distribution statistically demonstrates what image quality evaluation value is associated with a high degree of consistency between images of the same finger and a low degree of consistency between images of different fingers, that is, associated with a high discriminability. An image quality evaluation value associated with a discriminability evaluation value that should be ensured is designated as a threshold. Thus, when a vascular image is newly registered, an experiment of authentication need not be actually performed. Merely by calculating an image quality evaluation value of the vascular image, and registering a vascular image whose image quality evaluation value exceeds the threshold, a highly discriminable vascular image can be registered.

Figure 7A:
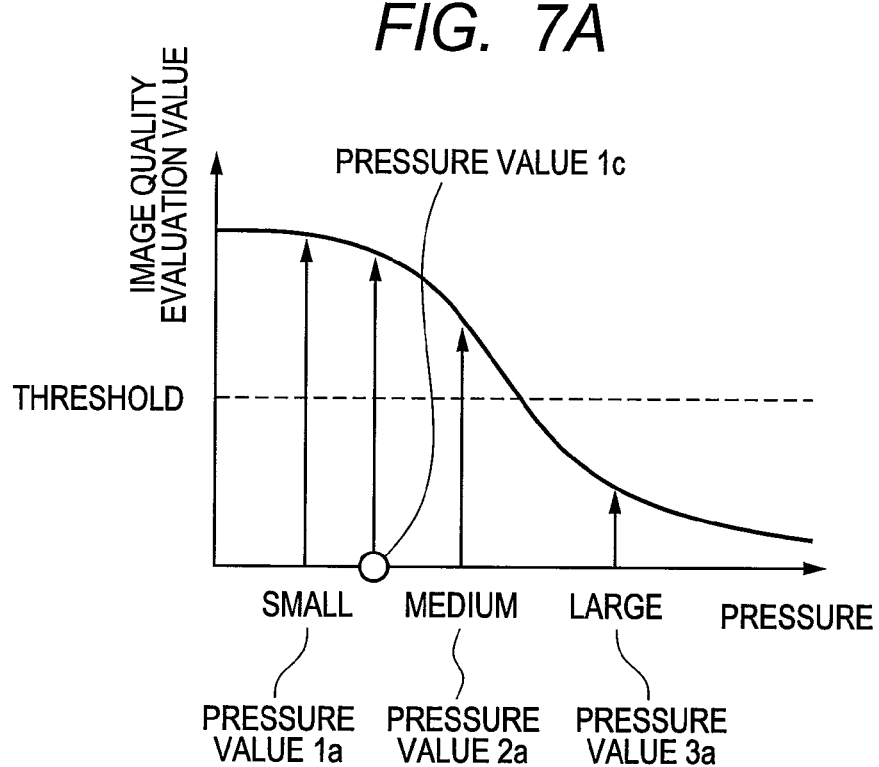
FIG. 7A and FIG. 7B are diagrams showing examples of a variation in the image quality evaluation value deriving from a variation in a pressure value.
Figure 7B:
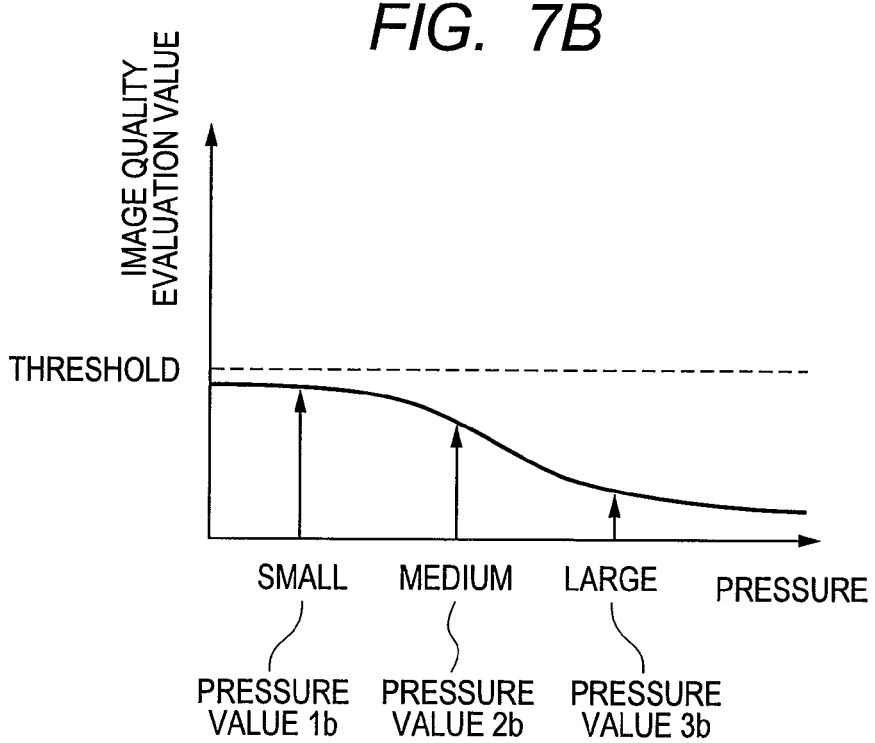

If any of vascular patterns is lost because a finger is pressed on the device, when a user alleviates a pressure, the number of vascular patterns to be extracted from an image picked up increases along with a decrease in the pressure. Accordingly, an image quality evaluation value gets higher as shown in the graphs of FIG. 7A and FIG. 7B. If the pressure value is not taken into account, when a feature quantity exceeds a predesignated value, performance in discriminating a vascular image is guaranteed and the vascular image is recognized as being registrable. In this case, when the finger is kept presented with a pressure value $2a$ in the graph of FIG. 7A, the vascular image is registrable. Otherwise, an image quality evaluation value of an image obtained after a pressure is alleviated is compared with an image quality evaluation value of an image obtained before the pressure is alleviated. If a change rate gets lower than a predetermined change rate, the image quality evaluation value of the image obtained after the pressure is alleviated may be regarded as a registrable value with which discrimination performance is guaranteed. As for the predetermined change rate, for example, a minimum value of a change rate of an image quality evaluation value to be detected in the course of alleviating a pressure and holding a finger still is measured on numerous subjects during a preliminary experiment. The change rate that is the largest minimum value among the minimum values obtained from the subjects is regarded as the predetermined change rate. Alternatively, the predetermined change rate may be determined for each person who presents his/her finger.

In reality, any of vascular patterns is lost with the pressure value $2a$. Unless a force is alleviated down to a pressure value $1a$, a loss in vascular patterns due to pressing cannot be completely resolved. By prompting a user to alleviate a pressure until an increase in an image quality evaluation value becomes unobservable, a stable vascular image in which any of vascular patterns is not lost because of pressing can be acquired for each finger irrespective of the number of vascular patterns of a finger.

In particular, as for registration data that serves as a standard for authentication after being registered and that is requested to be the most reliable data, as long as a pressure value is smaller than a pressure value is in FIG. 7A, a loss in vascular patterns is nearly minimized, or in other words, an image quality evaluation value is maximized. Therefore, an image obtained at a pressure value smaller than the pressure value $1c$ is preferably registered. The pressure value $1c$ is determined as a pressure value at which the image quality evaluation value does not increase any longer despite the pressure value has decreased from the pressure value at which a frame preceding an immediately previous frame or an image further preceding the frame is acquired.

Further, an insufficient image quality evaluation value deriving from a loss in vascular patterns occurring when a finger is presented at a pressure value $3a$ in the graph of FIG. 7A can be discriminated from an insufficient image quality evaluation value obtained when a pressure is alleviated to take on a pressure value $1b$ in the graph of FIG. 7B. Therefore, for the insufficient image quality evaluation value deriving from the loss in vascular patterns, a user is prompted to alleviate a pressure. Thus, the image quality evaluation value is increased in order to produce a registrable image. For a finger in which only a few vascular patterns are contained and which brings about the insufficient image quality evaluation value even when the pressure is alleviated, the user is prompted to re-present another finger in order to improve the discriminability of a registered image.

When a pressure value is also recorded in the storage device 5 at the time of registration, if 1-to-1 authentication is carried out, the display unit 17 or the like is used to prompt a user to present his/her finger with the same pressure as the pressure exerted during registration. Thus, reproducibility can be improved.

In the first embodiment, inclusion of a contact sensor as an instrument for improving authentication precision would prove effective in guaranteeing that a finger is in contact with the device and that there is a correlation between a pressure exerted from the finger and an image quality evaluation value. The detail will be presented below in relation to a second embodiment.

Second Embodiment

Figure 8:
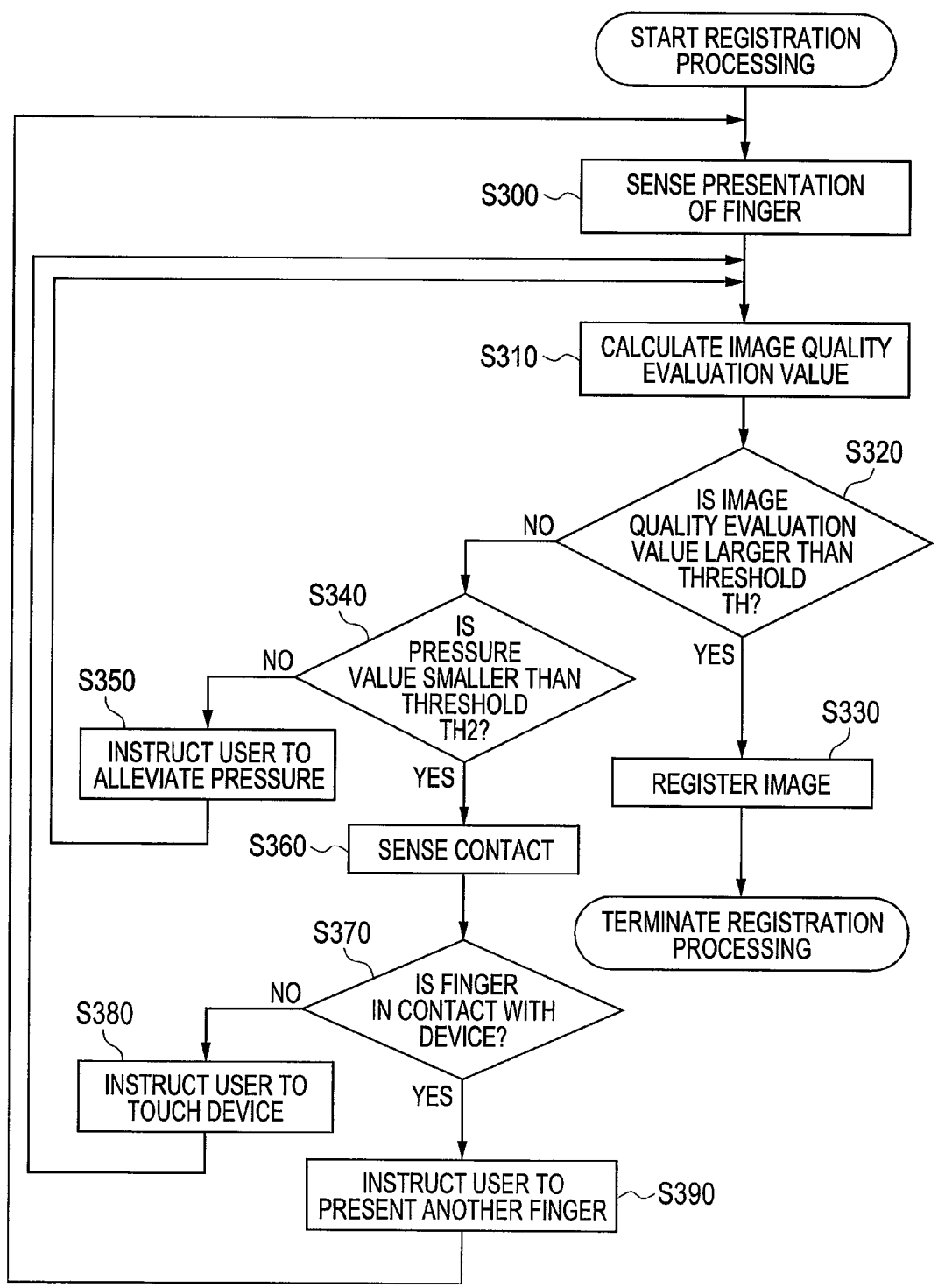
FIG. 8 is a diagram showing an example of a flowchart describing registration processing in accordance with the present invention.

An embodiment including a contact sensor in addition to the same components as those of the first embodiment will be described below in conjunction with the flowchart of FIG. 8. First, presentation of a finger is sensed at step S200, and an image quality evaluation value is calculated at step S210. Thereafter, at step S220, the image quality evaluation value is checked to see if it exceeds a threshold TH. If the image quality evaluation value exceeds the threshold TH, an image concerned is registered at step S230. If the image quality evaluation value falls below the threshold, at step S240, a pressure value is checked to see if it falls below a threshold TH2. As for a method of determining the threshold TH2 for pressure values, similarly to the aforesaid example of the method of determining the threshold TH for image quality evaluation values, all registered data items in a database are plotted with a discriminability evaluation value marked on the axis of ordinates and a registration-time pressure value marked on the axis of abscissas. Thus, registration-time pressure values sustainable by discriminability evaluation values can be statistically determined. If the pressure value exceeds the threshold TH2, the display unit 17 or the like is used to instruct a user to alleviate a pressure at step 250. If the pressure value falls below the threshold TH2, contact of a finger is sensed at steps S260 and S270. If the finger is not in contact with the device, at step S280, the user is instructed to touch the device. If the finger is in contact with the device, the user is instructed to present another finger at step S290.

As for sensing contact of a finger, although a user is instructed to alleviate a pressure for the purpose of preventing a finger from being pressed on the device and increasing an image quality evaluation value, some people may release the hand from the device. In this state, vascular patterns cannot be stably extracted. In addition, the image quality evaluation value may be decreased. There arises a possibility that although the number of vascular patterns a finger has is large enough to register an image of the finger, presentation of another finger may be instructed. By sensing floating of a finger, a state in which a pressure is alleviated and the finger is in contact with the device can be retained. Therefore, guidance can be given to instruct presentation of another finger. As a finger floating sensing instrument, aside from an output value of a pressure sensor, a distance sensor or image processing may be adopted. For sensing floating of a finger through image processing, a method of sensing the floating on the basis of a change in the contour of the finger or a method of sensing the floating on the basis of deformation of vascular patterns is conceivable.

In the embodiments 1 and 2, examples of steps ending with a step of authenticating registered data have been introduced. The present invention can be used to decide on precision in authentication data to be collated with registered data. An example will be described below in relation to a third embodiment.

Third Embodiment

Referring to FIG. 9, an example of authentication processing employed in the present invention will be described below. First, a presented finger is sensed at step S400, and an initial image quality evaluation value is calculated at step S410. Thereafter, an image is collated with a registered image at step S420. In the case of 1-to-N authentication, the image is collated with all of N registered images. In the case of 1-to-1 authentication, the image is collated with a specific registered image. At step 430, whether the inputted vascular image is consistent with the registered image is decided. If the inputted image is consistent with the registered image, post-authentication processing is performed at step S440. If the inputted image is inconsistent, a user is instructed to alleviate a pressure at step S450. The image quality evaluation value is re-calculated at step S460. At step S470, whether the image quality evaluation value does not increase any longer is decided. If the image quality evaluation value does not increase any longer, the inputted image is collated with a registered image again.

Figure 10A:
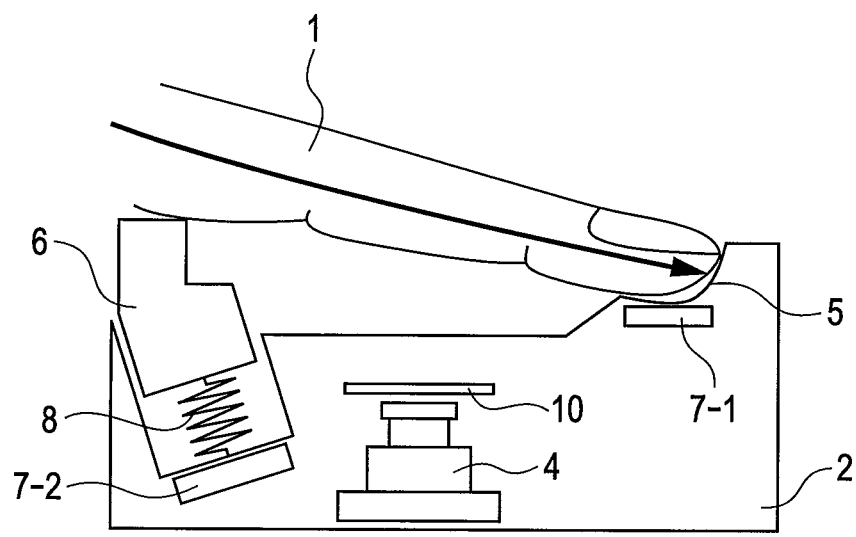
FIG. 10A and FIG. 10B are diagrams showing examples of a structure of an authentication device having an elastic member disposed under a finger placement guide part.
Figure 10B:
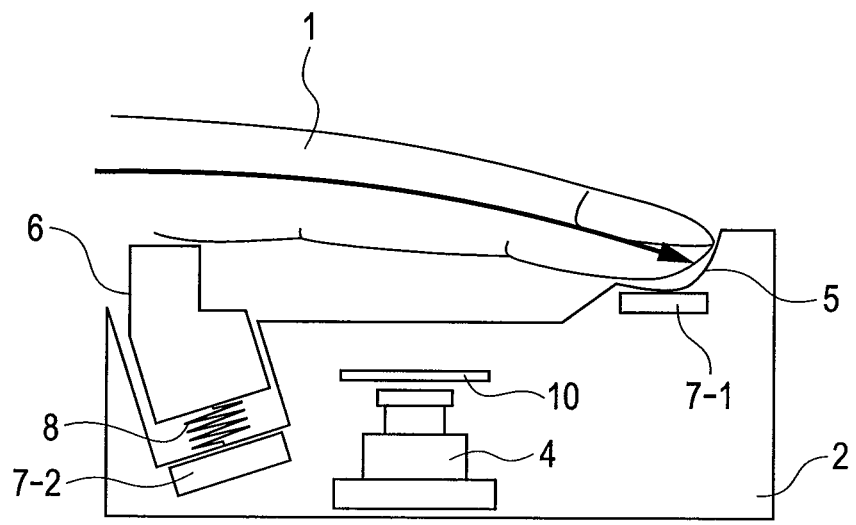
Figure 11A:
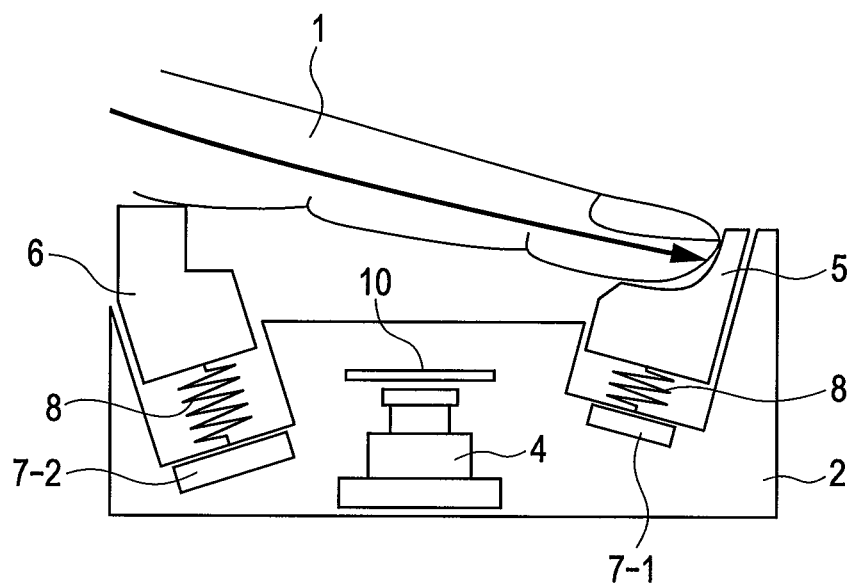
FIG. 11A and FIG. 11B are diagrams showing examples of a structure of an authentication device having an elastic member disposed under each of a finger placement guide part and a fingertip guide part.
Figure 11B:
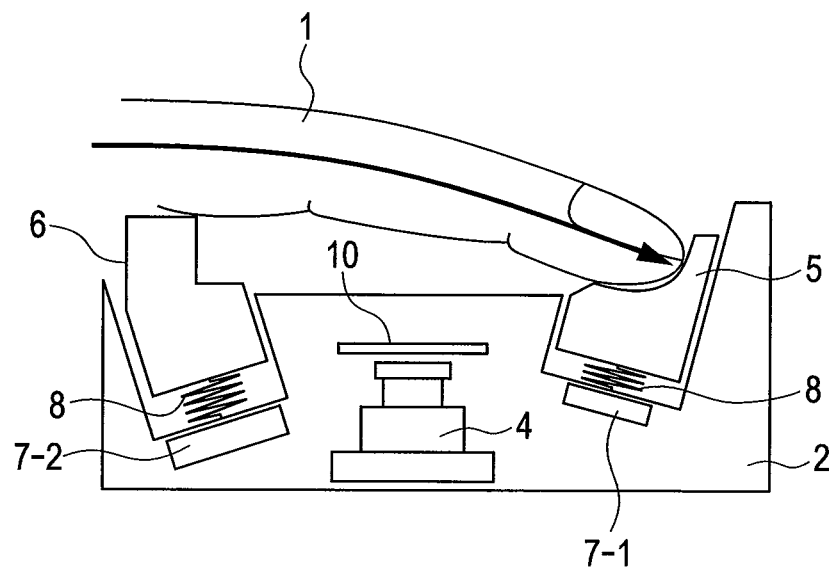

Since the finger placement guide part 6 sinks downward due to the operation of the elastic member 8, a pressure exerted on a finger is alleviated and a loss in vascular patterns can be suppressed. A direction in which the finger placement guide part 6 sinks may not be a perpendicular direction. Assume that the finger placement guide part 6 sinks obliquely forward toward a fingertip. In this case, even if a finger is warped at the time when the root of the finger first comes into contact with the finger placement guide part as shown in FIG. 10A, since the finger placement guide part sinks forward as shown in FIG. 10B, the finger is more likely to bend than it is when the finger placement guide part sinks perpendicularly. Therefore, a loss in vascular patterns due to the warping can be prevented. Further, the elastic member 8 may be sandwiched between the fingertip guide part and pressure sensor. As shown in FIG. 11A and FIG. 11B, when the fingertip guide part sinks obliquely downward toward the root of a finger, the finger is more likely to bend, and is hardly warped. As mentioned above, a pressing force applied in an advancing direction in which a living body presents his/her finger to the device can be alleviated. This is an advantage attributable to the fact that the finger placement guide part is disposed obliquely toward the living body with respect to the upper side of the device.

Numerous subjects are asked to gather and an experiment is performed in advance. A pressure value which the largest number of subjects exerts at the time of registration is designated as a pressure value at which the elastic member 8 begins sinking. A user is prompted to use the device in such a manner that the elastic member 8 do not sink. Thus, the user can be guided to a state of a specific pressure without the necessity of giving a special instruction to the user during registration or authentication. Eventually, reproducibility improves. Otherwise, if a limit position at which the elastic member 8 sinks is set to an appropriate position at which many fingers are neither warped nor excessively bent, an optimal finger condition can be readily reproduced. Otherwise, if an attempt is made to forcibly sink the elastic member 8 to a deeper position than the appropriate position, a repulsive force of the elastic member 8 may vary to prevent the elastic member from sinking deeper than the appropriate position.

Figure 12A:
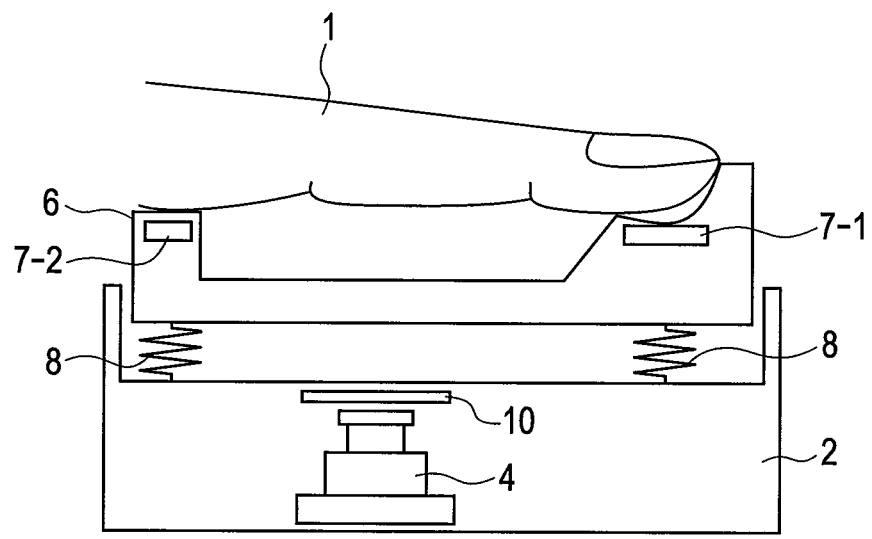
FIG. 12A and FIG. 12B are diagrams showing examples of a structure of an authentication device having a finger placement guide part and a fingertip guide part interlocked with each other to sink.
Figure 12B:
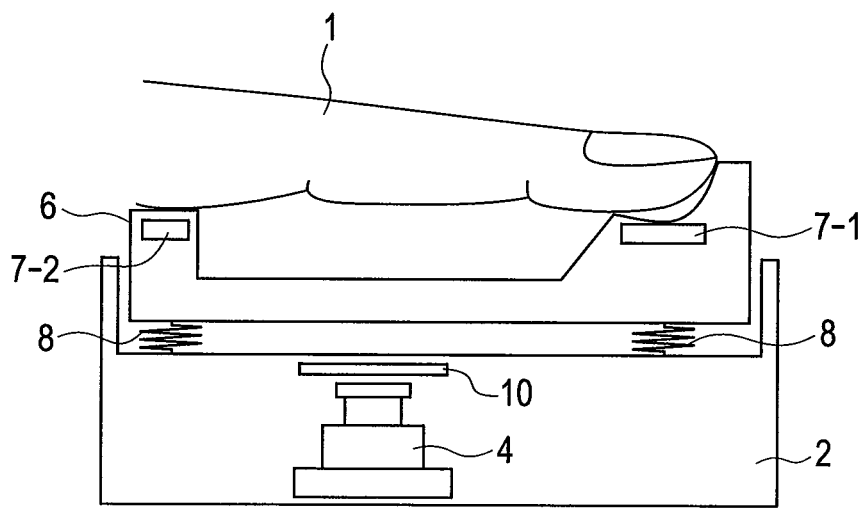

As shown in FIG. 12A and FIG. 12B, the fingertip guide part 5 and finger placement guide part 6 may sink while being interlocked with each other.

Figure 13A:
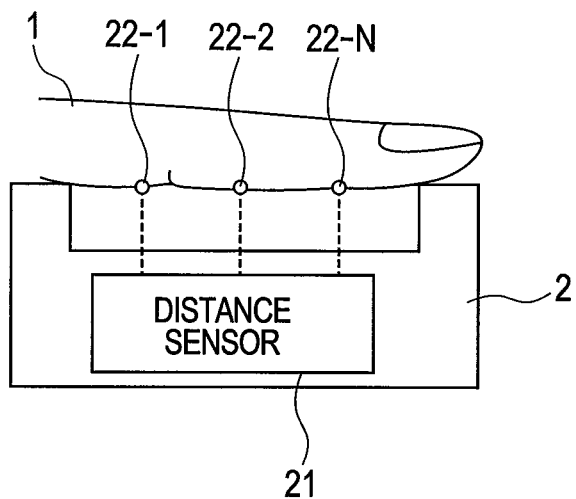
FIG. 13A and FIG. 13B are diagrams showing examples of a structure of an authentication device including a distance sensor.
Figure 13B:
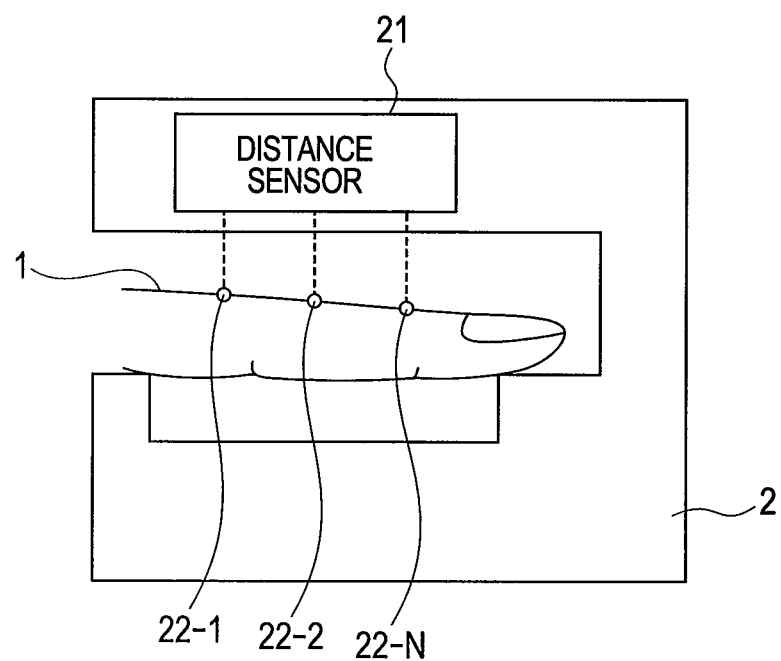

The vein authentication device shown in FIG. 2 may not include the elastic member 8. When the elastic member 8 is not included, warping of a finger is likely to occur. However, any instrument other than the elastic member 8 may be used to sense the warping of a finger. For example, a distance sensor 21 or the like is used to measure a distance between a finger and the sensor. This makes it possible to sense warping of the finger. As shown in FIG. 13A and FIG. 13B, distances from the distance sensor to three or more distance measurement points 22-1, 22-2, etc., and 22-N, which lie on a straight line extending in a longitudinal direction of a finger on the ventral or dorsal side of the finger are measured. Based on deviations from distances measured with a planar entity placed, a state of warping or bending of the finger or floating thereof can be detected. As the distance sensor, an optical type or an ultrasonic type may be adopted.

The pressure sensor 7-1 and pressure sensor 7-2 may be disposed in the lower part of the entire device. When the pressure sensors are located at three positions, that is, at the positions of the finger placement guide part 6 and fingertip guide part 5 and at the position in the lower part of the device, the breakdown of a pressure applied to the entire device can be learned. Therefore, when the breakdown of the pressure is recorded at the time of registration, reproducibility for 1-to-1 authentication can be improved.

Figure 14A:
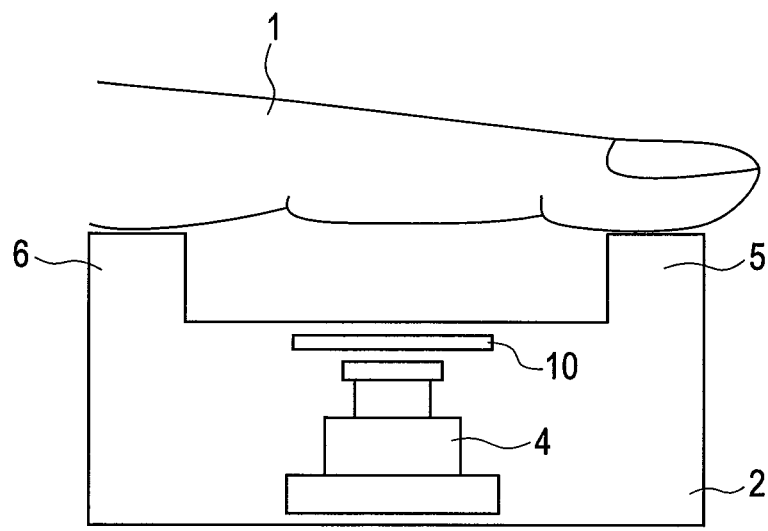
FIG. 14A and FIG. 14B are diagrams showing examples of a structure of an authentication device having a pressed position separated from an imaging unit.
Figure 14B:
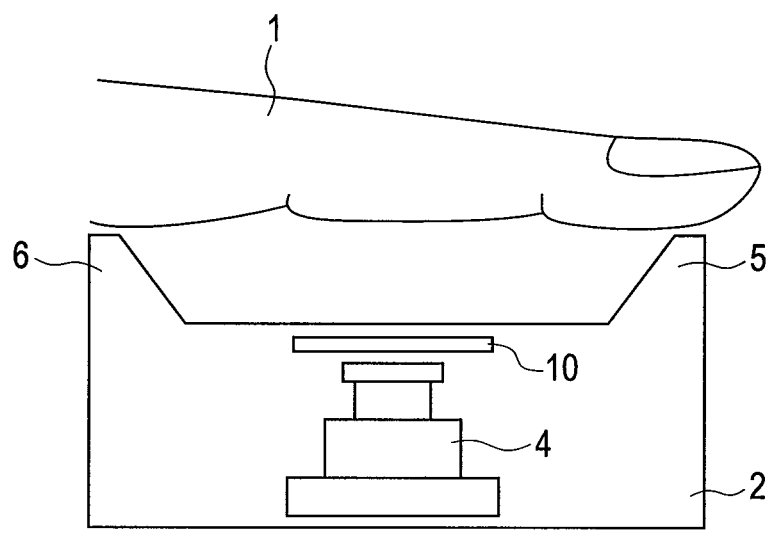

Even when guidance is given to alleviate a pressure, as long as a finger is brought into contact with the device, the device is more or less pressed. Any of vascular patterns may therefore be lost. Therefore, positions on the finger placement guide part 6 and fingertip guide part 5 respectively at which a finger come into contact with the respective guide parts are, as shown in FIG. 14B rather than FIG. 14A, separated from the imaging unit 4. Thus, an adverse effect of pressing on a loss in vascular patterns can be minimized.

Figure 15A:
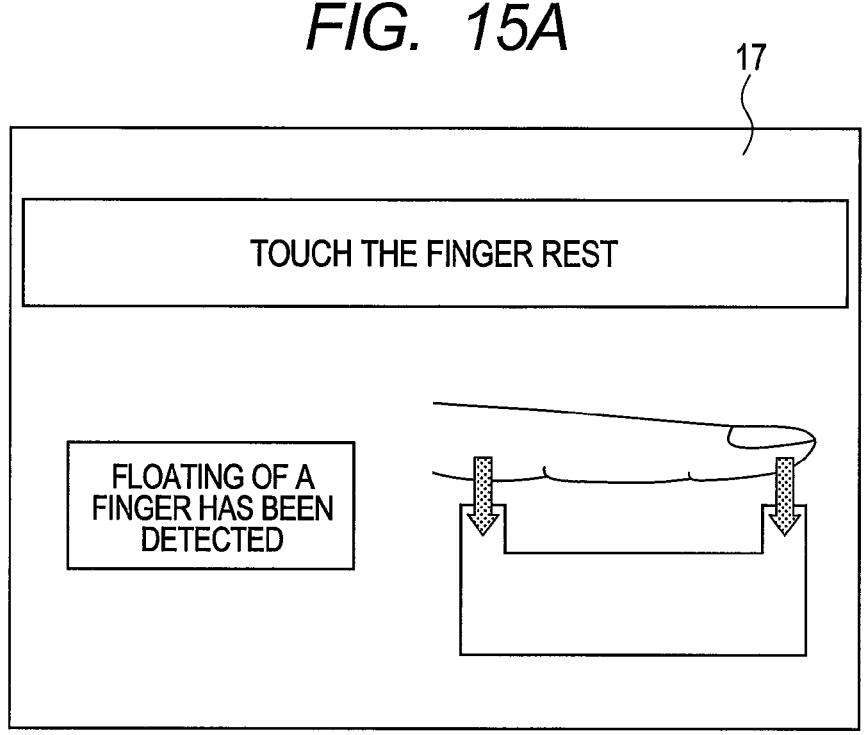
FIG. 15A and FIG. 15B are diagrams showing examples of a registration screen image for use in guiding a finger to a correct state of presentation.
Figure 15B:
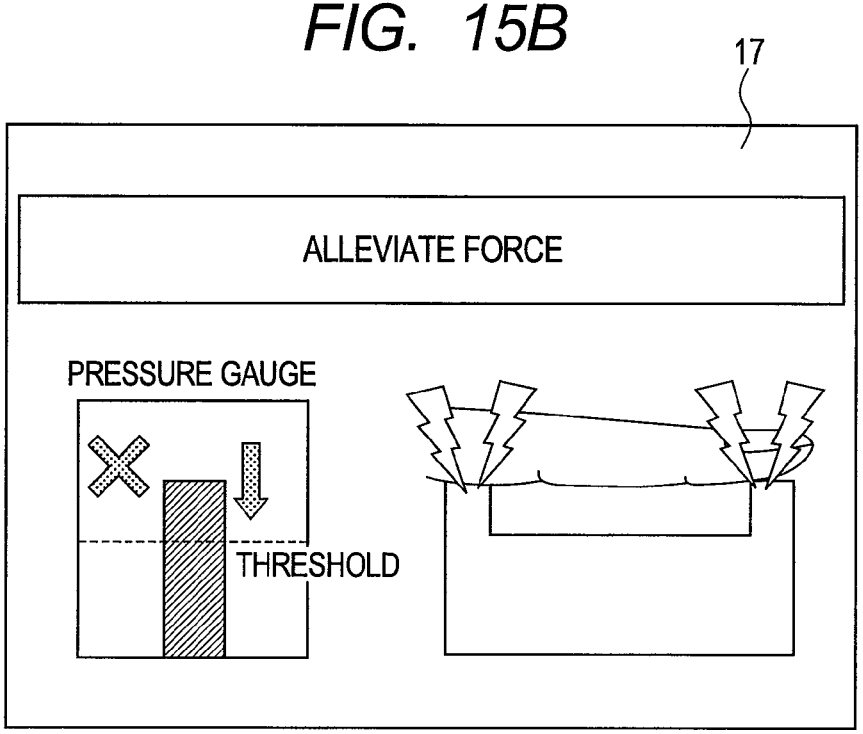

FIG. 15A and FIG. 15B show examples of a registration screen image on which a user's state of presentation of a finger is displayed at the time of registration in order to guide the user to a correct state of presentation. At the time of registration, almost all users are unfamiliar with the authentication device. Therefore, it is necessary to give guidance about a way of presenting a finger. The state of presentation of the finger 1 is displayed on the display unit 17 that is a monitor or the like. While a user looks at the display unit 17, the user changes the state of presentation of a finger according to the guidance.

As information displayed on the display unit 17, output values of the pressure sensors 7, an image quality evaluation value, information on sensed floating of a finger, a degree of bending of the finger, a degree of warping of the finger, and a degree of sinking of the elastic member 8 are cited. According to a state of finger presentation, the information displayed on the display unit 17 is switched to another in real time.

For example, when a pressing force is too large, an indicator indicating a pressure value and a graphic or animation expressing a scene where a finger is strongly pressed on the device is also displayed, and a guidance sentence, "Alleviate the pressing force," is displayed on the display unit 17. If floating of a finger, bending thereof, warping thereof, or sinking of the elastic member 8 is observed, a graphic or animation expressing the state is used to show a floating finger, a bent finger, a warped finger, or the sinking elastic member 8. The graphic or animation is displayed on the display unit 17 together with a guidance sentence such as "Do not float the finger," "Do not bend the finger," or "Do not warp the finger." Based on these pieces of information, a user can learn how to present his/her finger.

In addition, whether a way of placing a finger has been corrected can be verified instantaneously by looking at the indicator. When a user correctly performs registration work according to guidance given on the screen, an issue of a loss or change in vascular patterns that derives from pressing of a finger or floating thereof and that is hardly discovered even if a managing person attends to the user can be solved.

In registration processing employed in the present invention, even when a user presents his/her finger as instructed, if an image quality evaluation value is low, the user may be prompted to present another finger. Therefore, some person may presumably present plural fingers. An image quality evaluation value of a vascular image of a finger presented secondly or later may not always be higher than an image quality evaluation value of an image of a finger presented first. Therefore, when the user is prompted to present plural fingers, an image of a finger having the highest image quality evaluation value among all picked up vascular images is registered. In addition, all registering persons may be prompted to present plural fingers, and a vascular image of a finger having the highest image quality evaluation value among all vascular images of the plural fingers of each registering person may be registered. Vascular images of all fingers may be registered, and an image of a finger having the highest image quality evaluation value may be instructed to be presented at the time of authentication.

As mentioned above, sharper vascular patterns are picked up using an image quality evaluation value or by controlling a pressure in order to extract a larger number of pieces of vascular information. Thus, pieces of information based on shadings of blood vessels can be more precisely extracted.

Fourth Embodiment

In relation to a fourth embodiment, a description will be made of an instrument that extracts feature information from shading of a vascular pattern in an image acquired as an authentication image.

Figure 16:
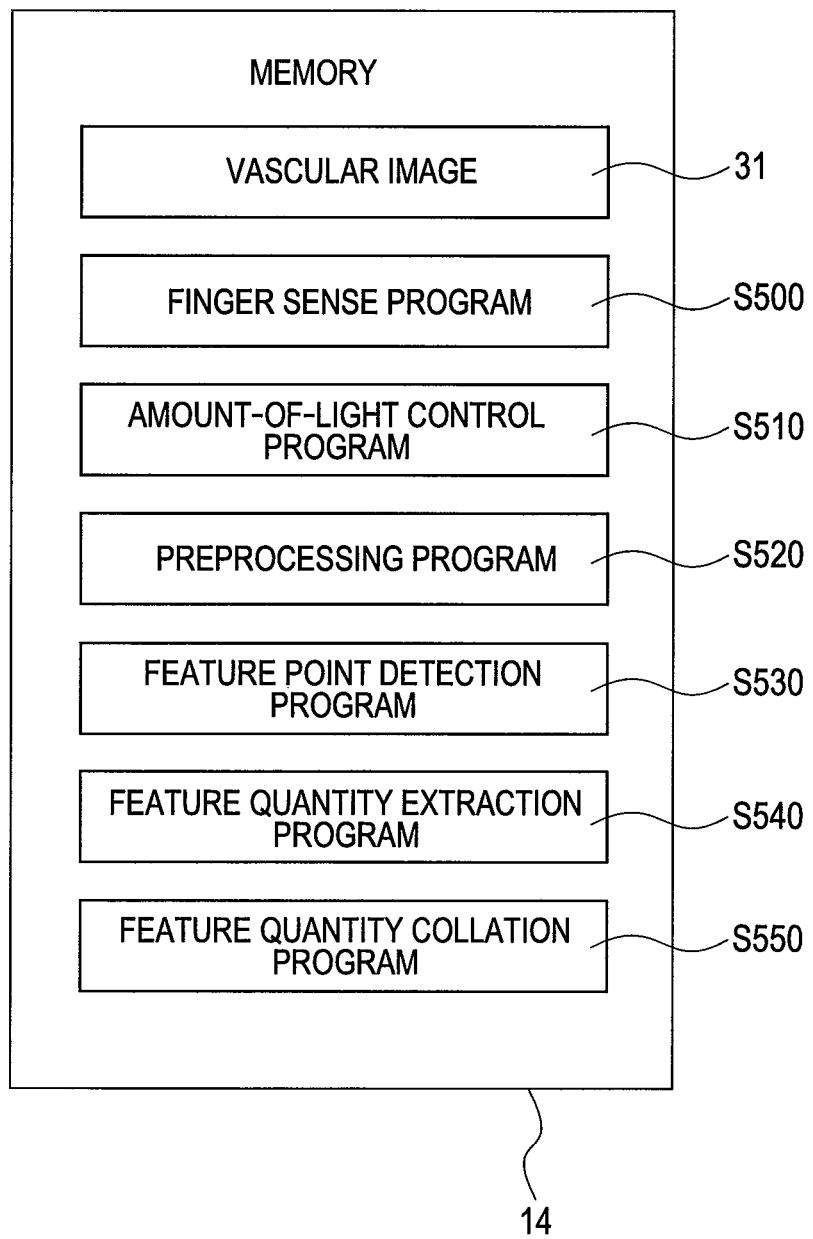
FIG. 16 is an example of a block diagram showing authentication processing in accordance with the present invention.

An example of an authentication processing procedure based on a feature point matching method will be described using processing blocks of an authentication device shown in FIG. 16. First, a vascular image 31 stored in the memory 14 is used as an input to perform processing of sensing presentation of a finger at step S500. When presentation of a finger is sensed, an amount of light emitted from the light source 3 is adjusted at step S510 so that the sharpest vascular image can be acquired. For the adjustment, a technique of monitoring a mean luminance value of an image all the time and feeding back and controlling an amount of light according to the value, a technique of applying an evaluation function, with which a decision is made on the sharpness of a pattern, to an image of finger vein patterns, and adjusting an amount of light so as to optimize the result of the application may be employed.

As an example of deciding on a brightness level of a vein pattern, an evaluation function may be determined so that as a larger number of blood vessels is extracted, the patterns can be made sharper.

Figure 17A:
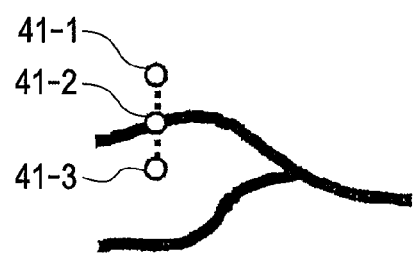
FIG. 17A and FIG. 17B are diagrams showing examples of a method of expressing luminance rise-and-fall information.
Figure 17B:
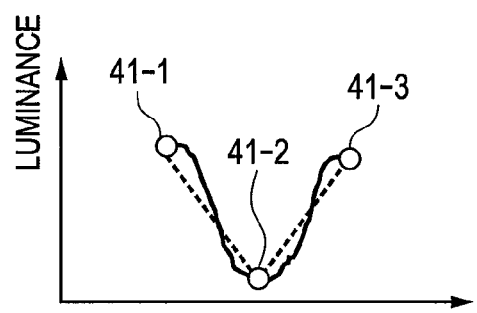

Thereafter, preprocessing is performed at step S520. A picked up vascular image contains many noises such as roughness and wrinkles on the surface of a finger other than blood vessel images. The blood vessels are not always sharply visualized. Therefore, processing of enhancing the blood vessel images alone and suppressing the noises is needed. As preprocessing, such a technique as edge retention smoothing filtering or unsharp masking can be adopted. After completion of the preprocessing, at step S530, feature points 51 are directly detected in the image having blood vessel images enhanced. FIG. 17A and FIG. 17B show three points 41-1, 41-2, and 41-3 on a vascular image, and a luminance profile along a straight line linking the three points.

Figure 18A:
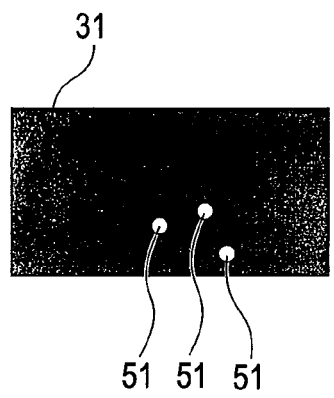
FIG. 18A and FIG. 18B are diagrams showing examples of a finger image, feature points, and feature quantities employed in authentication.
Figure 18B:
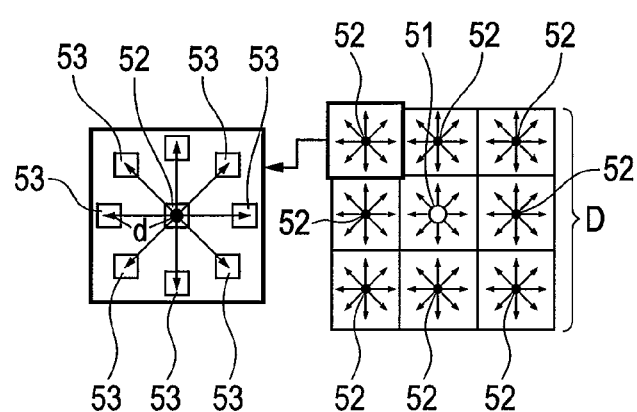

For detection of feature points, a rise and fall in luminance such as a curvature or angle, which is expressed by differences in magnitude among luminance values at three or more points on a straight line in a vascular image like the ones shown in FIG. 17A, or a gradient expressed by a difference between luminance values at two points is utilized. Hereinafter, a description will be made on the assumption that information based on the difference between luminance values is referred to as information on a rise and fall in luminance, that is, luminance rise-and-fall information. The luminance gradient or luminance curvature is used to detect a branching point or bending point of a blood vessel image, at which the rise and fall in luminance is stable and specific, from a shaded image of blood vessels like the one shown in FIG. 18A. Thereafter, a feature quantity is extracted from each of the feature points 51 detected at step S540. Herein, a method of obtaining the feature quantity by adopting the luminance gradient or luminance curvature as luminance rise-and-fall information around each of the feature points 51, or a method of obtaining the feature quantity using both the luminance rise-and-fall information around each of the feature points 51 and a bloodstream direction of a blood vessel around the feature point may be adopted. As an example of the method of regarding the luminance rise-and-fall information around each of the feature points 51 as the feature quantity, there is a method of dividing a square area of D pixels by D pixels, which has each of the feature points 51 as a center, into nine subareas of three subareas in rows and in columns, and regarding histograms of luminance gradients (FIG. 18B), which relate to eight respective directions in each of the subareas, as feature quantities. The feature quantities relevant to one feature point include positional information on the feature point 51 and 72-dimensional pieces of luminance rise-and-fall information. The luminance gradient histograms in each of the nine subareas are calculated using as a gradient a difference in a luminance value between each of reference pixels 53, which are located in eight directions at a distance d from a standard pixel 52 located in the center of each subarea, and the standard pixel 52.

Finally, feature quantity collation processing is performed at step S550. All feature points in a registered image are compared and associated with all feature points in a collation image. When a similarity between the closest feature quantities at feature points exceeds a predesignated threshold, the feature quantities are associated with each other. The ratio of the number of feature points, which are associated with counterparts, to the sum total of feature points in the registered image and collation image alike is regarded as a consistency percentage. When the consistency percentage exceeds a pre-designated threshold, the fingers in the respective images are decided as the same finger of the same person.

A registered image and input image which are collated with each other can be accurately aligned with each other by utilizing a positional relationship in coordinates between associated points which are obtained by associating feature points at a feature point in the registered image with those at a corresponding feature point in the input image. After alignment is completed by performing rotational movement or parallel movement on an image plane and correcting three-dimensional geometric deformation, collation is performed according to a technique other than feature point matching, such as, a template matching method. Thus, the consistency percentage of venous images of the same finger can be upgraded more greatly than it can when the feature point matching method or template matching method is used solely.

In an authentication device that permits high freedom in presentation of a finger and that is use-friendly and highly convenient, a positional deviation of a finger or a roll thereof is likely to occur. Reproducibility of an image of the presented finger is degraded. Therefore, in a collation method using vascular patterns that express presence or absence of blood vessels, such as, a template matching method, when a deviation of a position of presentation of a finger gets larger, consistent areas in images to be collated with each other get narrower. This leads to an insufficient number of pieces of information to be used to identify an individual. Eventually, precision in authentication is degraded. Therefore, even when the areas in the images to be collated with each other are narrow, the precision in authentication can be held high by utilizing a larger number of pieces of information than the number of pieces of conventionally employed information such as vascular patterns that express presence or absence of blood vessels.

Figure 19A:
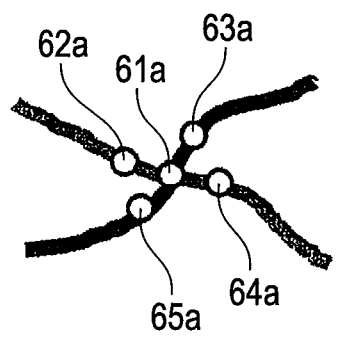
FIG. 19A and FIG. 19B are diagrams showing examples of a case where blood vessels intersect.
Figure 19B:
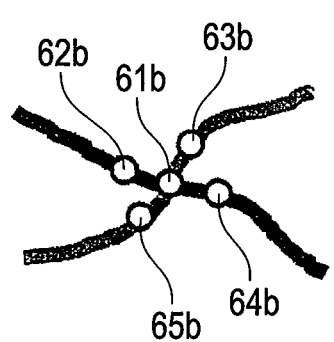

Two vascular images like the ones shown in FIG. 19A and FIG. 19B in each of which two blood vessels appear to intersect cannot be discriminated from each other. This is because the blood vessels in one of the images are recognized as being identical to those in the other image when they are expressed as vascular patterns by assigning two values to blood vessel images and the others respectively. However, by employing information on a depth in shading represented by a rise and fall in luminance, an anteroposterior relationship between the two crossing blood vessels can be grasped. The blood vessels shown in FIG. 19A can be discriminated from those shown in FIG. 19B and identified as the blood vessels different from those shown in FIG. 19B. In FIG. 19A, among five points 61a, 62a, 63a, 64a, and 65a, three points 63a, 61a, and 65a on the same blood vessel exhibit approximate luminance levels, and two points 62a and 64a on the blood vessel running behind the blood vessel exhibit approximate luminance levels. In FIG. 19B, since the anteroposterior relationship between the two blood vessels is reverse, three points 62b, 61b, and 64b exhibit approximate luminance levels, and two points 63b and 65b exhibit approximate luminance levels. Therefore, an area in which the blood vessels appear to intersect has higher specificity than the other area does, and has higher discriminability because it contains a larger number of pieces of feature information. Therefore, a finger image having many areas in each of which blood vessels appear to intersect is registered as a top priority. For collation, a feature quantity in the area in which the blood vessels appear to intersect is heavily weighted and collated with a counterpart of a registered image. Thus, when the feature quantity in the area in which the blood vessels appear to intersect is collated with the counterpart at a top priority, both upgrading of precision in authentication and speeding up of authentication can be achieved. When not only vascular information but also information on a fingerprint on the surface of a finger or information on wrinkles thereon is acquired as a feature quantity, discriminability can be upgraded. For example, after feature points are detected from branching points and bent points on blood vessel images using the foregoing technique, not only information on a luminance gradient of a blood vessel near each of the feature points but also information on a fingerprint and wrinkles on the surface of a finger near a point on the surface of the finger associated with the position of the detected feature point is acquired as a feature quantity.

Further, each pair of extracted feature points is compared with each other, and the positional relationship of each feature point to another feature point in a depth direction of a vascular pattern can be recognized.

Figure 20A:
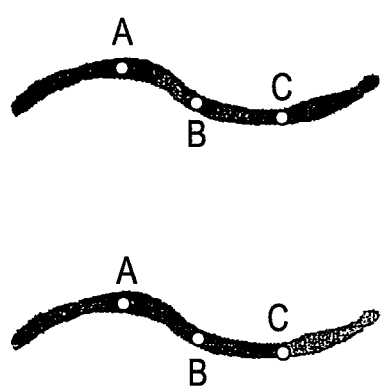
FIG. 20A and FIG. 20B are explanatory diagrams concerning discrimination of a blood vessel based on a positional relationship of each of feature points to a standard point.
Figure 20B:
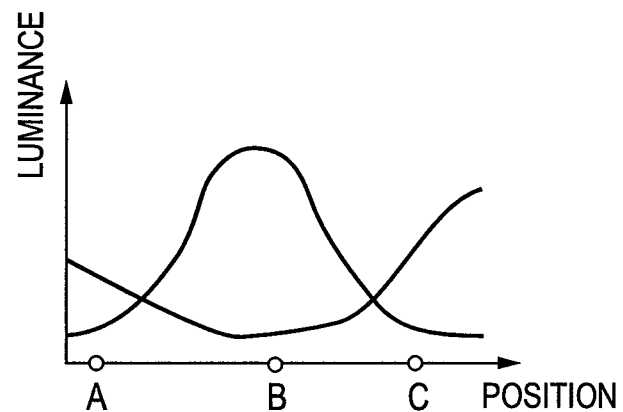

For example, assume that feature points A to C sharing the same feature information are found on each of two blood vessel images like those shown in FIG. 20A. In this case, merely by comparing pieces of feature information of the points A, points B, or points C in the two blood vessel images with each other, the two blood vessels are recognized as the same blood vessel. Therefore, as shown in FIG. 20B, a predetermined standard value is assigned to a luminance level in an image, and a luminance level at each of the feature points is compared with the luminance level. Thus, a relationship between the luminance values of two of the feature points can be acquired, that is, information on a shape in a depth direction of each of the blood vessels shown in an image plane can be acquired. Eventually, the two blood vessels shown in FIG. 20A can be discriminated from each other.

Further, independently of an irradiation intensity of a light source or the position of the light source, plural feature points that are detected at the same positions all the time can be extracted from blood vessels shown in a venous image by utilizing luminance rise-and-fall information. The luminance rise-and-fall structure of each vascular pattern can be reconstructed by linking the extracted feature points.

The reconstructed vascular shape in a depth direction is used for authentication in the same manner as it is in two-dimensional template matching. Thus, compared with a case where feature information is compared with a counterpart one by one, a load on computation can be markedly lightened.

In addition, the reconstructed vascular shape is produced based on feature points each of which exhibits stable depth information. Therefore, compared with a case where a three-dimensional structure is constructed directly from a picked up image, a stable vascular pattern permitting high precision in authentication can be obtained.

For reconstruction, a rise and fall in luminance of desired brightness is estimated for an extremely bright or dark area, and corrected. Thus, a change in an irradiation intensity of a light source can be coped with.

If the position of a light source is differentiated, an overall luminance slope of a venous image is changed. A relative position of a finger with respect to the light source is estimated from the luminance slope, and corrected so that the luminance slope can be flattened. Thus, a change in the position of the light source can be coped with.

Assuming that a finger vein authentication method based on a feature point matching method and described in relation to the present embodiment is regarded as a method A, and an authentication method based on a conventional template matching method is regarded as a method B, when the results of authentications performed according to the methods A and B respectively are integrated into a final result of authentication, higher precision in authentication can be attained.

The processing in accordance with the fourth embodiment may be performed solely. An image quality evaluation value described in relation to the first embodiment may be used to perform the processing in accordance with the first embodiment on a picked up image. An image recognized as containing sufficient vascular patterns may be adopted as an authentication image. In this case, a difference in luminance between ones of pixels constituting an image to be used for authentication becomes sharper. Since higher-precision luminance rise-and-fall information can be acquired, precision in authentication can be improved.

In order to more accurately acquire a larger number of pieces of luminance rise-and-fall information, if an amount of light to be irradiated from a light source is more precisely controlled, it would be effective. Precision in authentication can be further improved. In addition, even when an image quality evaluation value described in relation to the embodiments 1 and 2 is extracted, if an amount of light is appropriately controlled, a sharper vascular-pattern image can be produced and a highly precise content percentage can be attained. An example of a method of appropriately controlling an amount of light will be described below in relation to a fifth embodiment.

Fifth Embodiment

Figure 21:
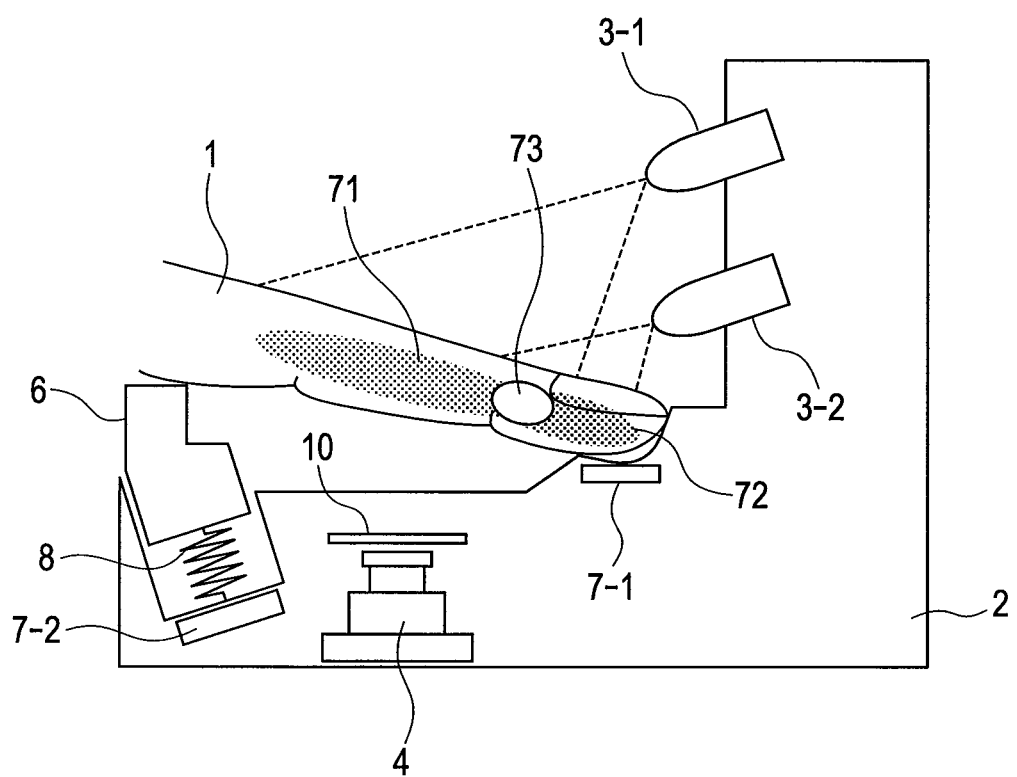
FIG. 21 is a diagram showing an example of a structure of an authentication device that controls an amount of light.

In the present embodiment, a device is, as shown in FIG. 21, shaped so that the upper part above a presented finger is left open so as not to give a user an oppressive feeling. Due to restrictions imposed on the device, two light sources disposed obliquely ahead of a fingertip are used to illuminate an entire finger.

When an amount of light irradiated from the light sources is so large that saturated luminance such as flared highlights occurs, rise-and-fall information is lost in a luminance-saturated area. Therefore, in an authentication method employing a rise and fall in luminance, presence of the saturated luminance is not preferred. However, when an irradiation intensity is feeble and an amount of light is insufficient, irregular luminance occurs. A vascular image gets entirely darker, and a bright vascular image is unavailable. Therefore, in particular, in the authentication method employing the rise and fall in luminance, acquisition of a sharp vascular image devoid of the saturated luminance and irregular luminance is preferred. Control to be described below is effective in accurately acquiring a large number of pieces of luminance rise-and-fall information employed in the fourth embodiment.

Figure 22:
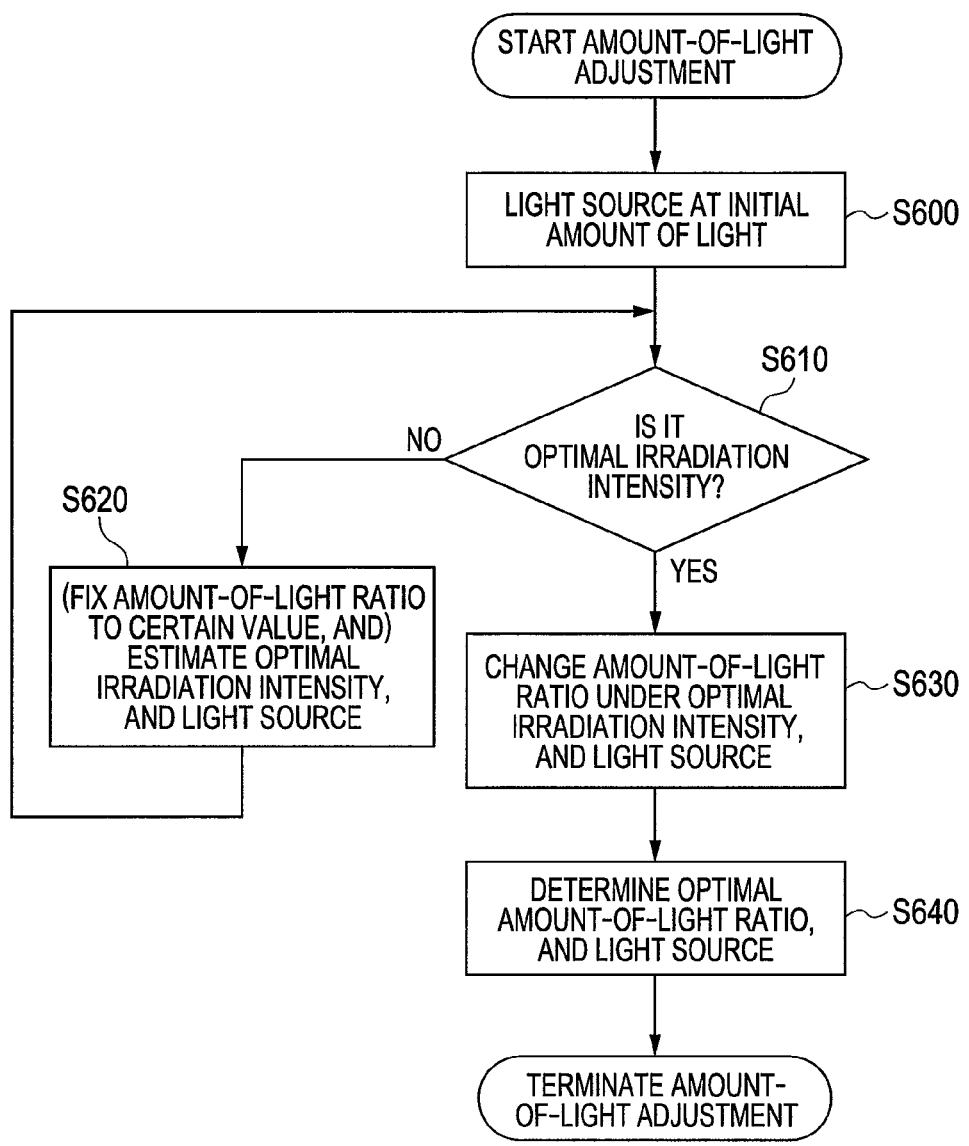
FIG. 22 is a diagram showing an example of a flowchart describing amount-of-light adjustment processing.
Figure 23A:
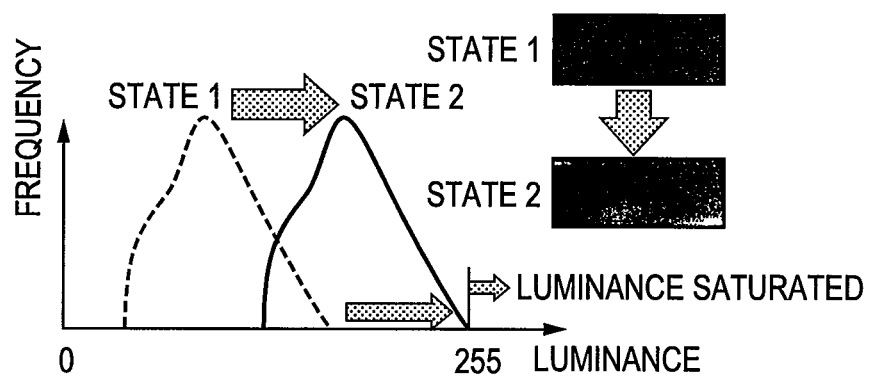
FIG. 23A and FIG. 23B are diagrams showing examples of a histogram and a change of a vascular image concerning amount-of-light adjustment processing.
Figure 23B:
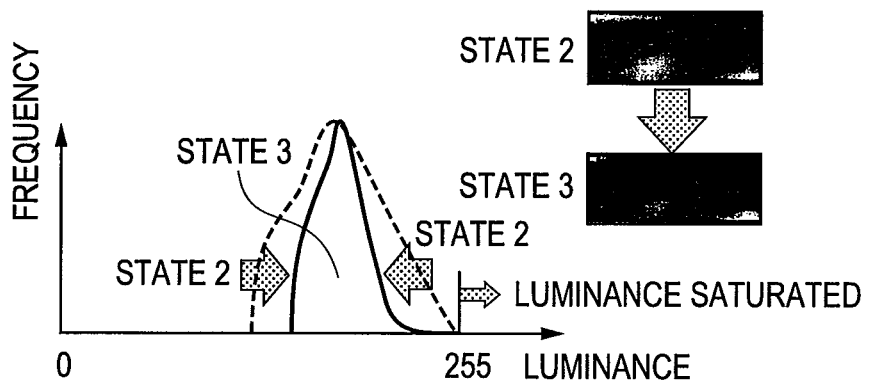

FIG. 22 is an example of a flowchart describing two-stepped amount-of-light adjustment. First, the light sources are lit to emit an initial amount of light at step S600. At steps S610 and S620, the ratio of amounts of light of the plural light sources 3 is fixed to an initial amount-of-light ratio and an irradiation intensity is varied in order to determine an optimal irradiation intensity. The optimal irradiation intensity refers to an irradiation intensity at which brightness is maximized to a limit at which luminance is not saturated under a certain amount-of-light ratio. A way of determining the ratio of initial amounts of light is, for example, to perform an amount-of-light control experiment on plural fingers in advance, and to select an amount-of-light ratio recognized as an optimal one for the largest number of fingers. When the irradiation intensity is varied with the amount-of-light ratio fixed, a luminance histogram of a vascular image is shifted with the shape thereof held intact (a transition from state 1 to state 2 in FIG. 23A). Light is once irradiated at a certain appropriate irradiation intensity, whereby a correlation between the irradiation intensity and a position on the histogram is obtained. Accordingly, the optimal irradiation intensity can be estimated. Next, at step S630, under the optimal irradiation intensity, the plural light sources are lit at several different amount-of-light ratios that are determined in advance. At step S640, the optimal amount-of-light ratio is determined so that an entire image becomes uniformly bright. The optimal amount-of-light ratio is determined based on an index that indicates how well the luminance histogram is shaped. For example, assuming that the index is a luminance dispersion level, as the dispersion level diminishes, the histogram has skirts thereof, which spread with a mean luminance level as a center, shrunk. An amount-of-light ratio minimizing the dispersion level is regarded as the optimal amount-of-light ratio (a transition from state 2 to state 3 in FIG. 23B).

According to the disposition of the light sources in the device structure shown in FIG. 21, there is an area 73 in which an irradiation range 71 of the finger root light source intended to irradiate the finger root overlaps an irradiation range 72 of the fingertip light source intended to irradiate a fingertip. The area varies depending on the thickness or length of a finger. Therefore, when the light sources are controlled mutually independently, a luminance-saturated area and a dark area deriving from an insufficient amount of light are created. This may lead to irregular luminance. Therefore, an optimal irradiation intensity at which luminance is not saturated and an optimal amount-of-light ratio at which an entire finger is illuminated uniformly have to be determined simultaneously.

By implementing a two-stepped amount-of-light control method in which after one of the optimal irradiation intensity and optimal amount-of-light ratio is determined, the other one is determined, a sharp vascular image devoid of irregular luminance or saturated luminance can be acquired irrespective of the thickness or length of a finger. In the present embodiment, after the optimal irradiation intensity is obtained, the optimal amount-of-light ratio is obtained under the optimal irradiation intensity. Alternatively, after the optimal amount-of-light ratio is obtained, the optimal irradiation intensity may be obtained under the optimal amount-of-light ratio. Two steps need not always be followed in order to perform amount-of-light adjustment. An irradiation intensity and an amount-of-light ratio may be varied simultaneously in order to determine the optimal irradiation intensity and optimal amount-of-light ratio. Thus, the amount-of-light adjustment may be achieved.

When the present invention is used in combination with any of the methods described in relation to the embodiments 1 to 4, a higher-precision image quality evaluation value and higher-precision luminance rise-and-fall information can be obtained, and higher precision in authentication can be obtained. The present embodiment may be implemented as a sole technique.

For implementing the present embodiment, if a light interceptor that prevents overlap of irradiation ranges is interposed between plural light sources, luminosity and an amount-of-light ratio can be designated effectively with higher precision. An example will be described in relation to a sixth embodiment.

Sixth Embodiment

Figure 24A:
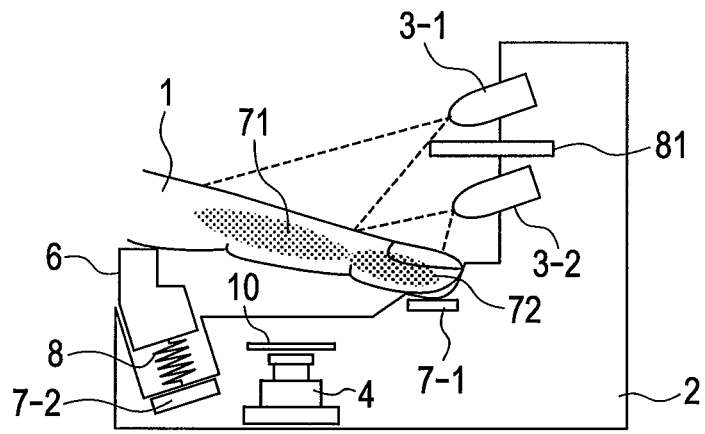
FIG. 24A, FIG. 24B, and FIG. 24C are diagrams showing an example of an authentication device including a light interceptor.
Figure 24B:
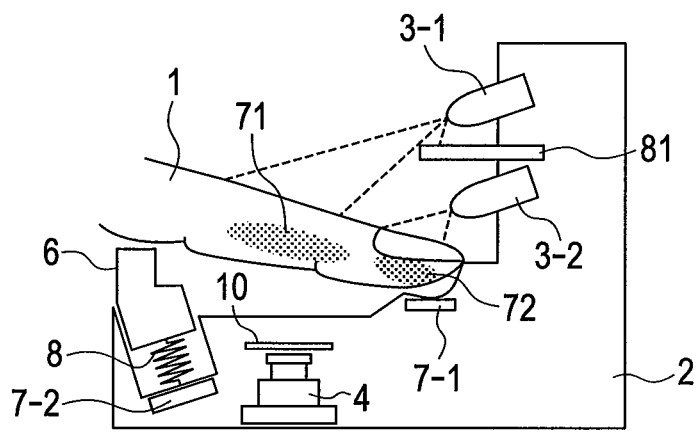
Figure 24C:
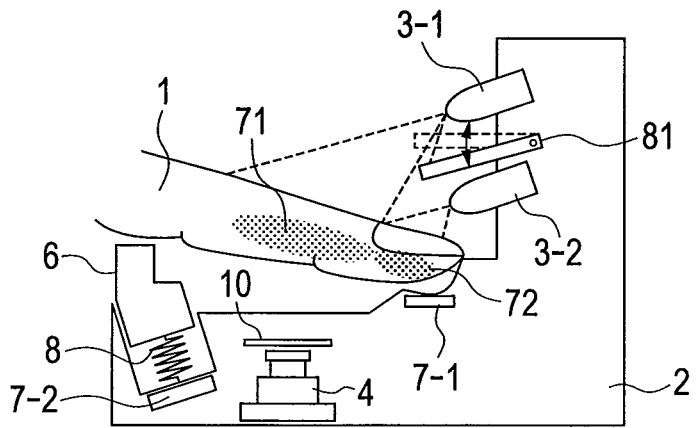

FIG. 24A shows an example of a structure showing an input interface of an individual authentication device including a light interceptor 81 that prevents overlap of irradiation ranges of plural light sources. FIG. 24A, FIG. 24B and FIG. 24C are side views of the input interface.

When irradiation ranges of two light sources overlap as shown in FIG. 21, if the light interceptor 81 is, as shown in FIG. 24A, used to intercept part of light irradiated from the light source intended to illuminate the root of a finger, the overlap of the irradiation ranges is eliminated. The necessity of taking account of the interrelationship between the light sources is obviated. Therefore, the plural light sources can be mutually independently controlled.

However, as shown in FIG. 24B, the irradiation ranges may not cover an entire finger because of disposition of the light interceptor 81, though it depends on the thickness of the finger. When the light interceptor 81 is, as shown in FIG. 24C, made movable, the entire finger can be brightly illuminated irrespective of an individual difference in the thickness of a finger.

The present invention is usable as an individual authentication device employing vascular patterns or a vascular pattern extraction device.

The invention claimed is:

1. An individual authentication device for authenticating an individual using feature information of a vascular pattern acquired from a living body, comprising:
    an imaging unit that images a region of the living body serving as an object of authentication; and
    an arithmetic unit that acquires one picked up image including the vascular pattern imaged by the imaging unit as an authentication image,
    wherein
    the arithmetic unit extracts a plurality of feature points in the vascular pattern of the one picked up image, each of which exhibits a predetermined feature, on the basis of luminance of the authentication image,
    the arithmetic unit calculates positional information of each of the feature points in the vascular pattern and a difference in the luminance between the feature points, and acquires the positional information and the difference in the luminance as the feature information,
    the arithmetic unit acquires luminance levels of the respective feature points as pieces of depth information attributable to the shape of the vascular pattern in a direction perpendicular to a plane on which the authentication image is formed,
    the arithmetic unit extracts pieces of information, which are based on the interrelationships in the perpendicular direction of the respective feature points, from the pieces of depth information, and
    the arithmetic unit acquires the pieces of information as pieces of feature information relevant to the respective feature points.

2. The individual authentication device according to claim 1, wherein
    the arithmetic unit extracts feature points where blood vessels intersect at a higher priority than other feature points during authentication.

3. The individual authentication device according to claim 1, wherein
    the arithmetic unit acquires the shape in the perpendicular direction of the vascular pattern on the basis of the pieces of depth information, and performs authentication using the shape of the vascular pattern in a planar direction of the image to be used for authentication, and the shape of the vascular pattern in the perpendicular direction.

4. The individual authentication device according to claim 1, wherein the arithmetic unit collates a registered image, which contains the feature information and is stored in advance, with the authentication image.

5. The individual authentication device according to claim 1, wherein the arithmetic unit uses the pieces of feature information relevant to the feature point in the authentication image and pieces of feature information relevant to a feature point in the registered image to align the authentication image and registered image with each other.

6. The individual authentication device according to claim 1, wherein the arithmetic unit computes an image quality evaluation value based on a ratio of the number of pixels, which constitutes the vascular pattern, to the number of pixels constituting the picked up image; and
    if the image quality evaluation value is equal to or larger than a predetermined value, the picked up image is acquired as the authentication image.

7. The individual authentication device according to claim 6, wherein the image quality evaluation value is a content percentage of the number of pixels, which constitutes the vascular pattern, to the number of pixels constituting the picked up image.

8. The individual authentication device according to claim 6, wherein the arithmetic unit includes a display unit that displays the results of computation performed by the arithmetic unit, and wherein when the image quality evaluation value is smaller than the predetermined value, the arithmetic unit causes the display unit to display an instruction, which prompts the living body to change the region serving as the object of authentication to another region.

9. The individual authentication device according to claim 8, further comprising:
    a guide part that bears a region other than the region serving as the object of authentication; and
    a pressure sensor that senses a pressure exerted from the living body placed on the guide part,
    wherein the arithmetic unit computes the value of the pressure from the living body; if the image quality evaluation value is smaller than the predetermined value, the arithmetic unit causes the display unit to display an instruction that prompts the living body to lower the pressure.

10. The individual authentication device according to claim 9, wherein when the image quality evaluation value is a value equal to or larger than a first predetermined value and the value of the pressure from the living body sensed by the pressure sensor is a value equal to or smaller than a second predetermined value, the arithmetic unit acquires the image as information to be used for authentication.

11. The individual authentication device according to claim 9, wherein the guide part has an elastic member that alleviates the pressure, and the elastic member is disposed obliquely in a direction in which the living body to be authenticated exists with respect to a direction perpendicular to a contact area of the individual authentication device.

12. The individual authentication device according to claim 8, further comprising:
   a contact sensor that senses contact or noncontact of the region of the living body with the guide part,
   wherein if the contact sensor decides that the living body is not in contact with the guide part, the arithmetic unit causes the display unit to display in instruction that prompts the living body to bring a finger of the living body into contact with the guide part.

13. An individual authentication device that acquires an image, which contains feature information of a vascular pattern acquired from a living body, so as to authenticate an individual, wherein:
   the vascular pattern is extracted from one picked up image from an imaging unit that images a region of the living body serving as an object of authentication;
   a plurality of points in the vascular pattern of the one picked up image, each of which exhibits a predetermined feature, are acquired as feature points; and
   a relative position between the feature points in the vascular pattern is calculated and a difference in degrees of shading between the feature points is calculated on the basis of the difference in the degrees of shading of the feature points so as to obtain the feature information;
   luminance levels of the respective feature points are acquired as pieces of depth information attributable to the shape of the vascular pattern in a direction perpendicular to a plane on which the image is formed,
   pieces of information, which are based on the interrelationships in the perpendicular direction of the respective feature points, are extracted from the pieces of depth information, and
   pieces of information are acquired as pieces of feature information relevant to the respective feature points.

* * * * *